United States Patent
Baresich

[11] Patent Number: 5,324,473
[45] Date of Patent: Jun. 28, 1994

[54] METHOD FOR MOLDING STRESS FREE AMORPHOUS AND CRYSTALLINE THERMOPLASTIC RESINS

[76] Inventor: Frank J. Baresich, 3216 Fairview Dr., Melbourne, Fla. 32934

[21] Appl. No.: 709,639

[22] Filed: Jun. 3, 1991

Related U.S. Application Data

[60] Continuation-in-part of Ser. No. 472,080, Jan. 30, 1990, abandoned, which is a division of Ser. No. 191,173, May 6, 1988, abandoned.

[51] Int. Cl.$^5$ ............................................. B29C 45/73
[52] U.S. Cl. ........................ 264/327; 264/328.16
[58] Field of Search .................. 249/114.1; 264/327, 264/328.16

[56] References Cited

U.S. PATENT DOCUMENTS

| | | | |
|---|---|---|---|
| 3,422,495 | 1/1969 | Jones | 249/134 |
| 3,619,449 | 11/1971 | Berard | 264/327 |
| 3,734,449 | 5/1973 | Itou et al. | 249/114.1 |
| 4,054,629 | 10/1977 | Wang et al. | 264/327 |
| 4,234,536 | 11/1980 | Thiel et al. | 264/544 |
| 4,285,901 | 8/1981 | Yotsutsuji et al. | 264/261 |
| 4,338,068 | 7/1982 | Suh et al. | 264/327 |
| 4,340,551 | 7/1982 | Wada et al. | 264/39 |
| 4,364,878 | 12/1982 | Laliberte et al. | 264/328.7 |

FOREIGN PATENT DOCUMENTS 0122207 10/1984 European Pat. Off. .
0202372 11/1986 European Pat. Off. .

*Primary Examiner*—Allan R. Kuhns

[57] ABSTRACT

Methods and apparatus for molding a thermoplastic article bring the surface of the mold cavity above the flow stress relaxation temperature of the molten plastic during molding of a part sufficiently long enough to relax the resin at the surface of the molded part and produce negligible residual stress. The surface of the mold cavity is maintained above the flow stress relaxation temperature of the molten plastic as the center of molten plastic in the mold cavity cools from a temperature above the solidification temperature toward the solidification temperature, thereby reducing flow-induced and temperature gradient induced stresses in the solidified mold material of the molded part. The heat of the molten plastic introduced into the mold is used as the source of the heat for heating the surface of the mold cavity. A layer of thermal flow control material about the mold cavity has a mathematical product of thermal conductivity, specific heat and density and appropriate thickness, so that heat from the molten plastic introduced into the mold cavity raises the temperature of the surface of the mold cavity above the flow stress relaxation temperature of the plastic being molded. The methods and apparatus are particularly useful for the molding of amorphous and crystalline resin parts and for rewritable optical data storage discs and optical lenses with minimized birefringence.

10 Claims, 16 Drawing Sheets

HYDRODYNAMIC SKIN-CORE STRUCTURE

MORPHOLOGIC ZONES

POLYCARBONATE

POLYSTYRENE

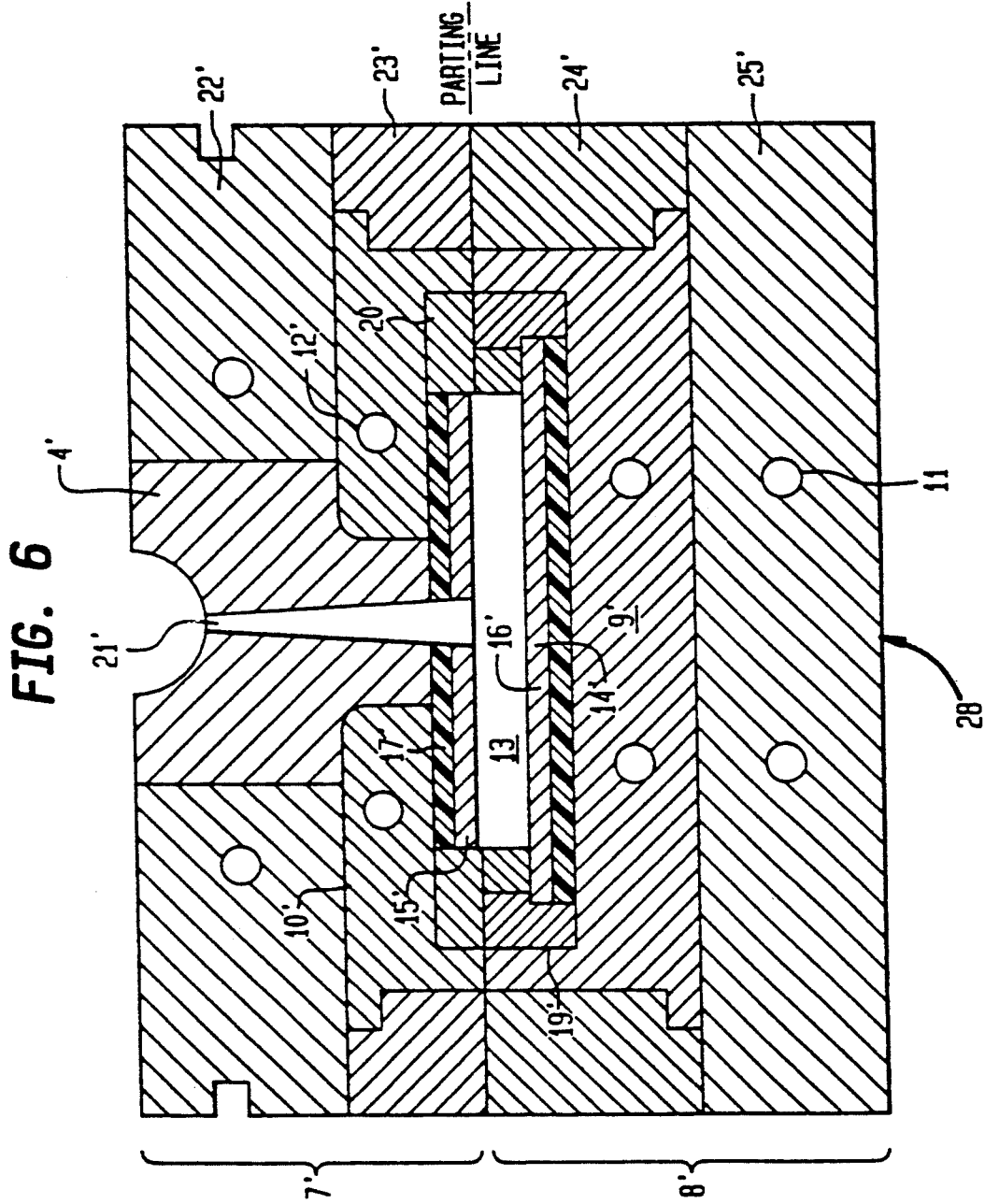

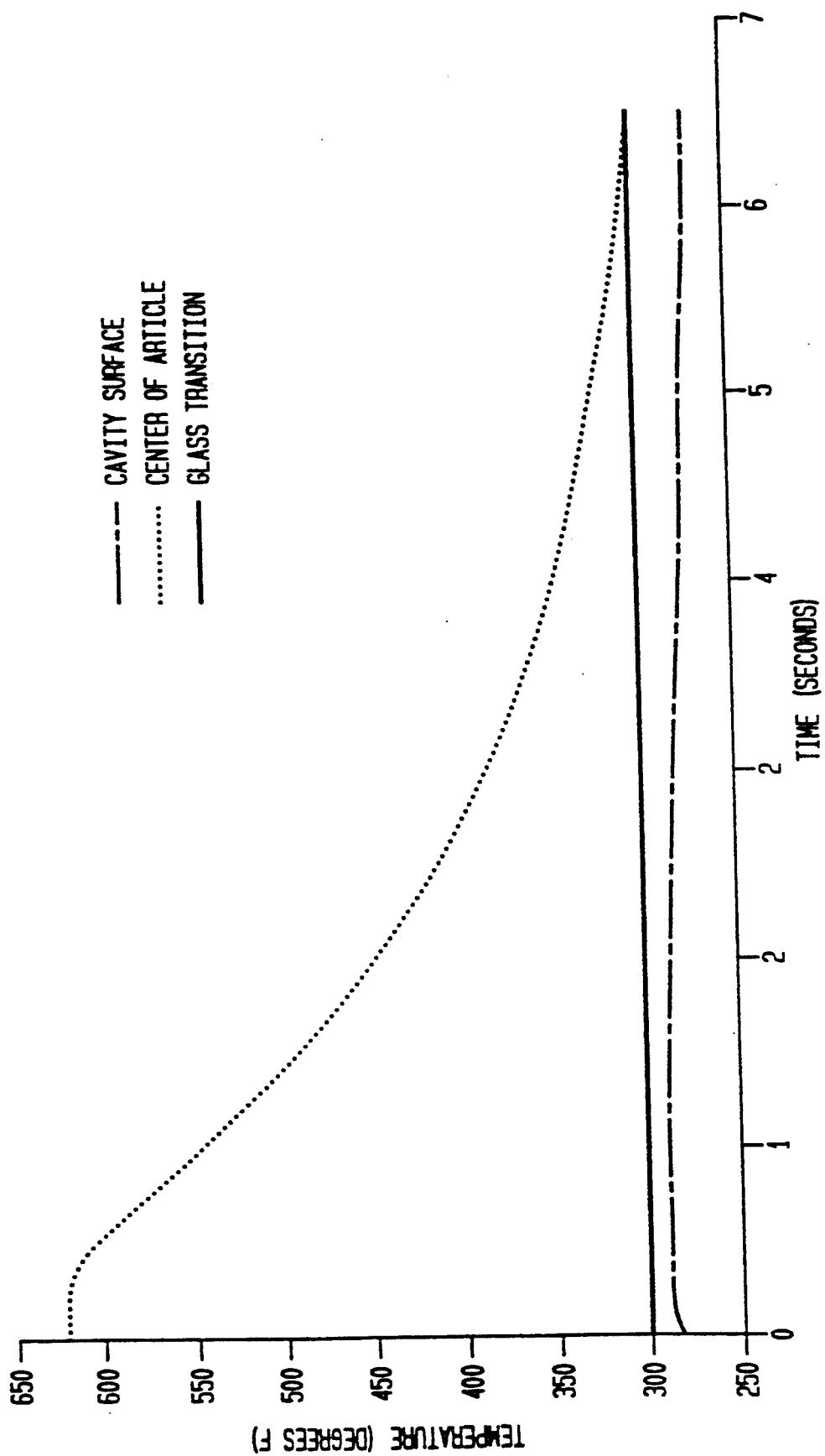

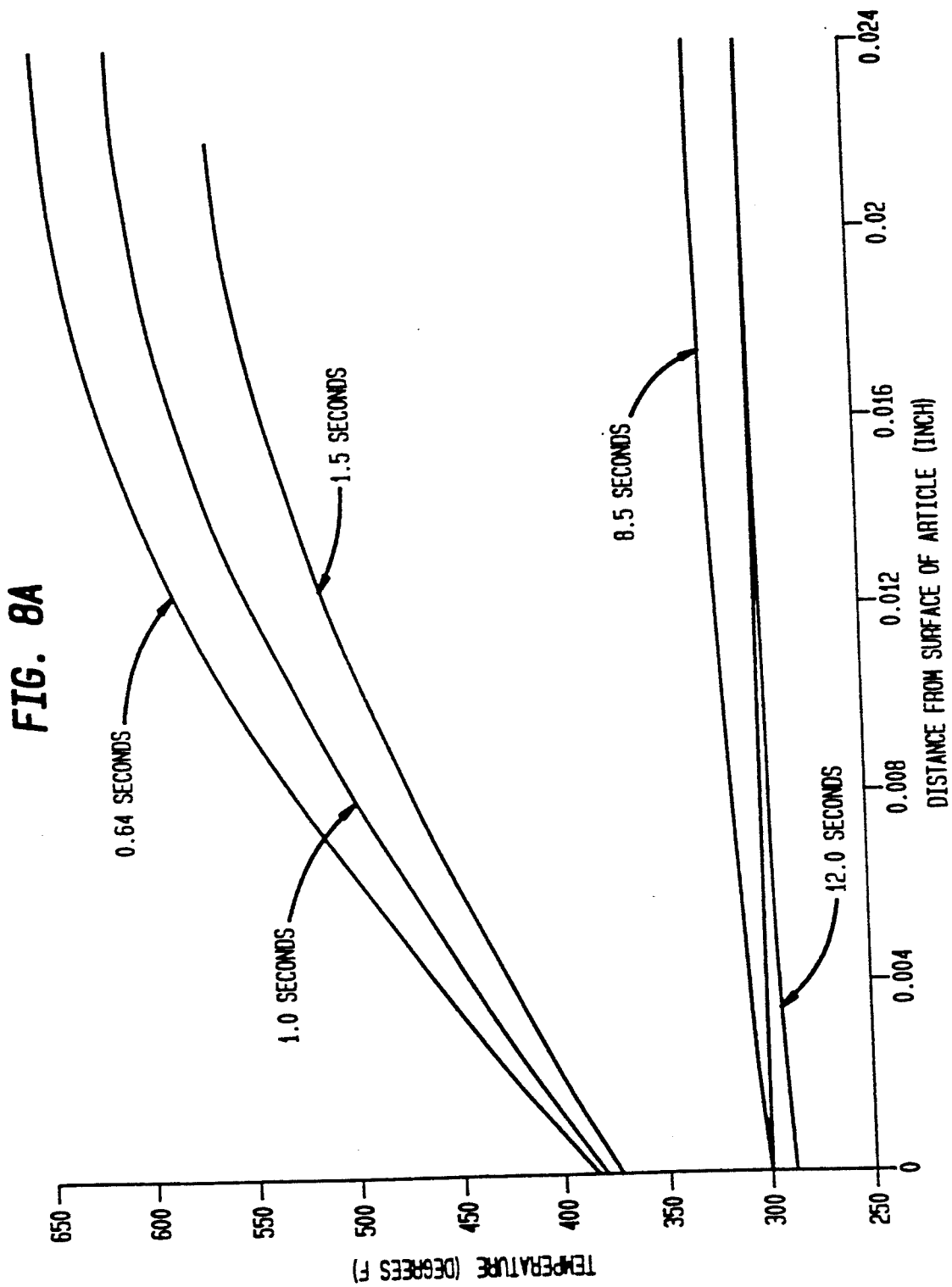

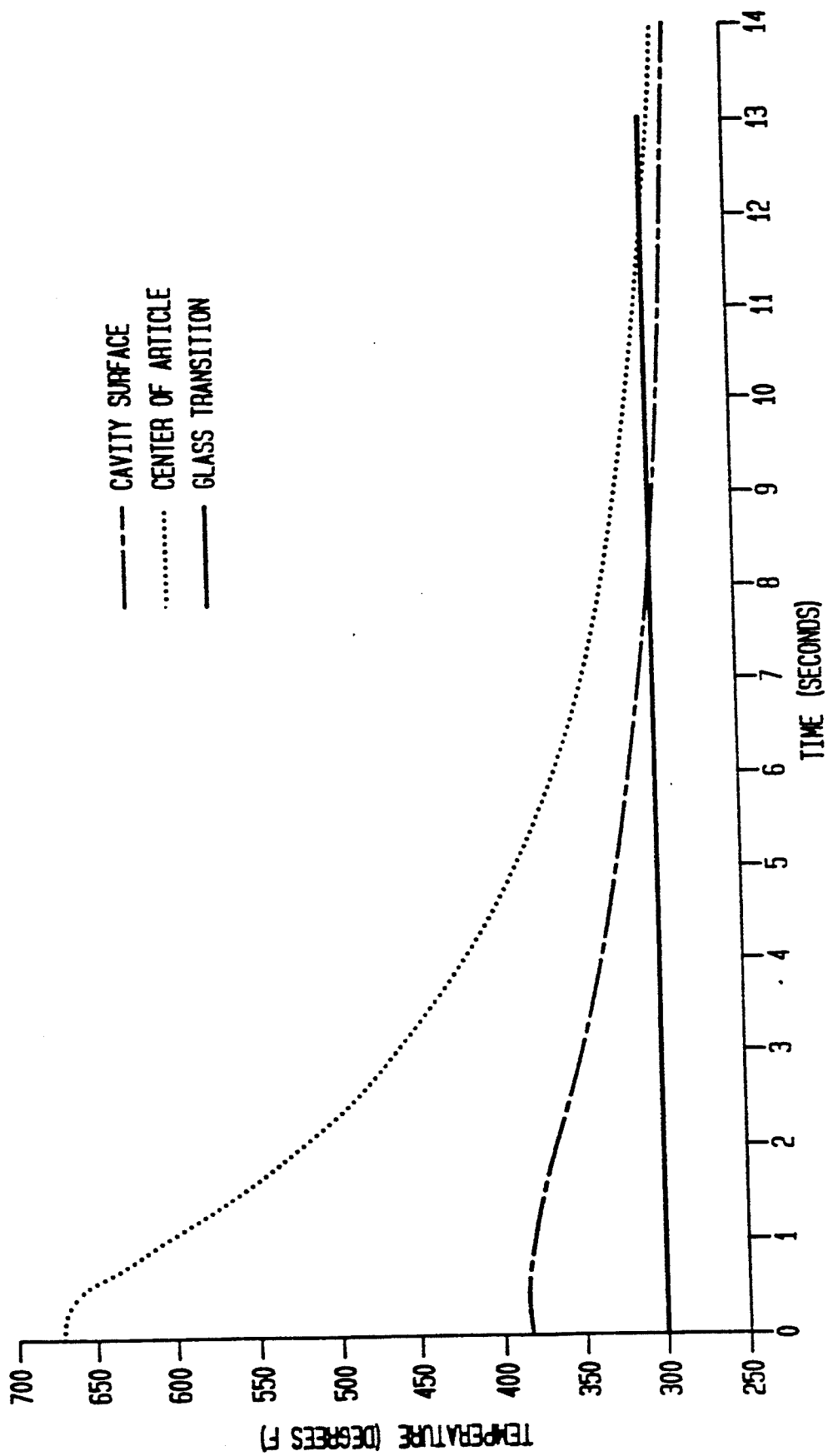

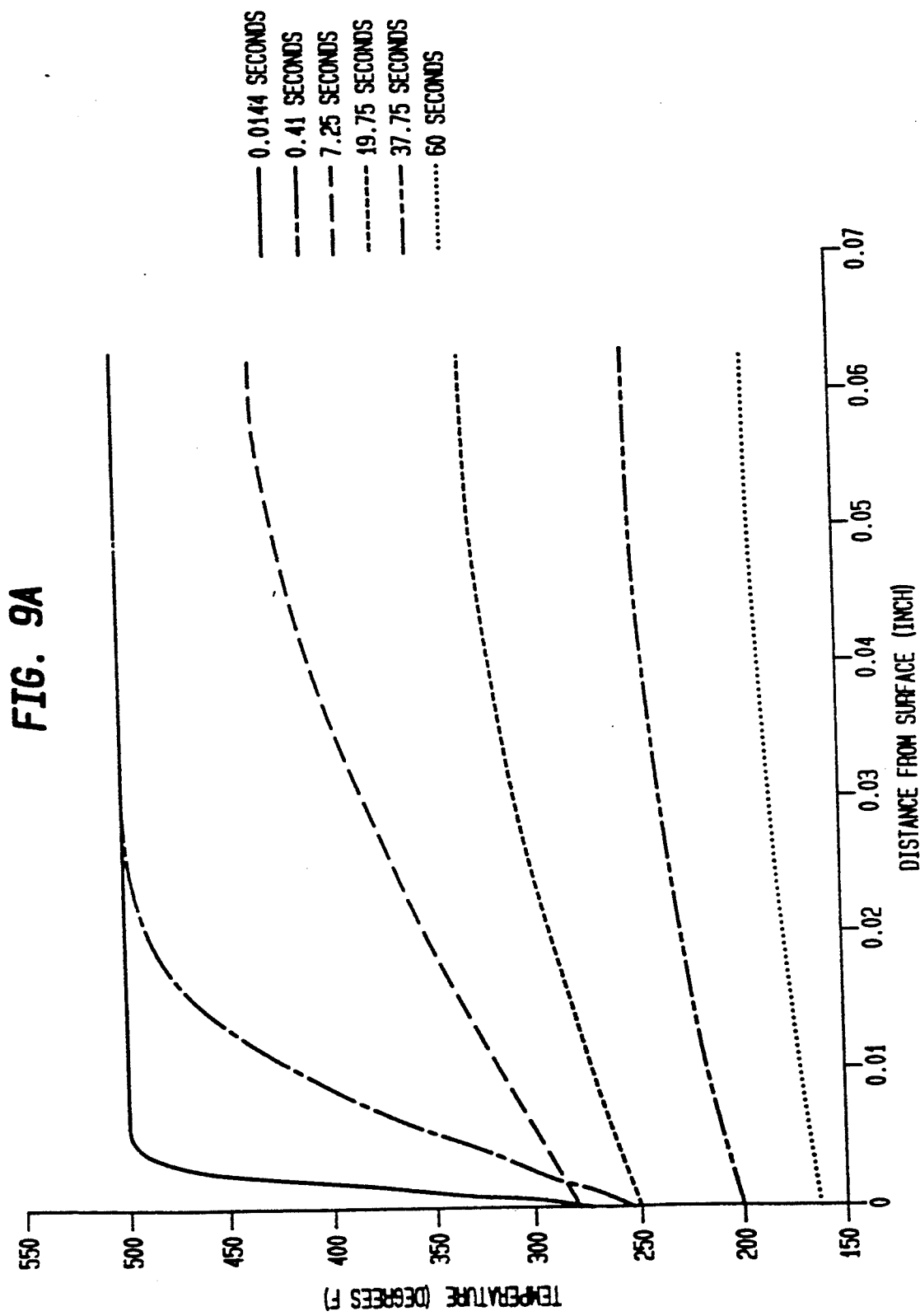

CONSTANT TEMPERATURE LINES
210 SECOND AFTER INJECTION

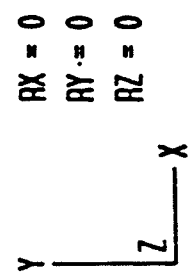
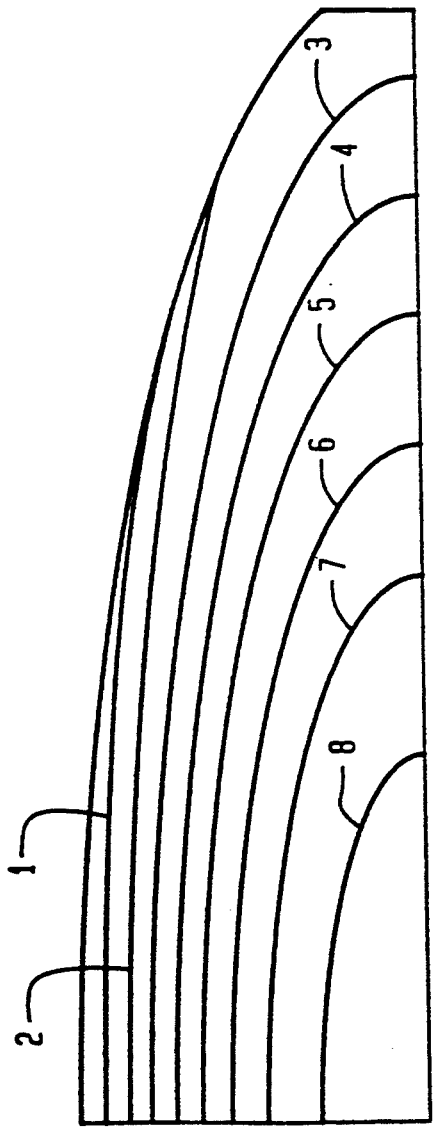
FIG. 12
CONSTANT TEMPERATURE LINES
290 SECOND AFTER INJECTION

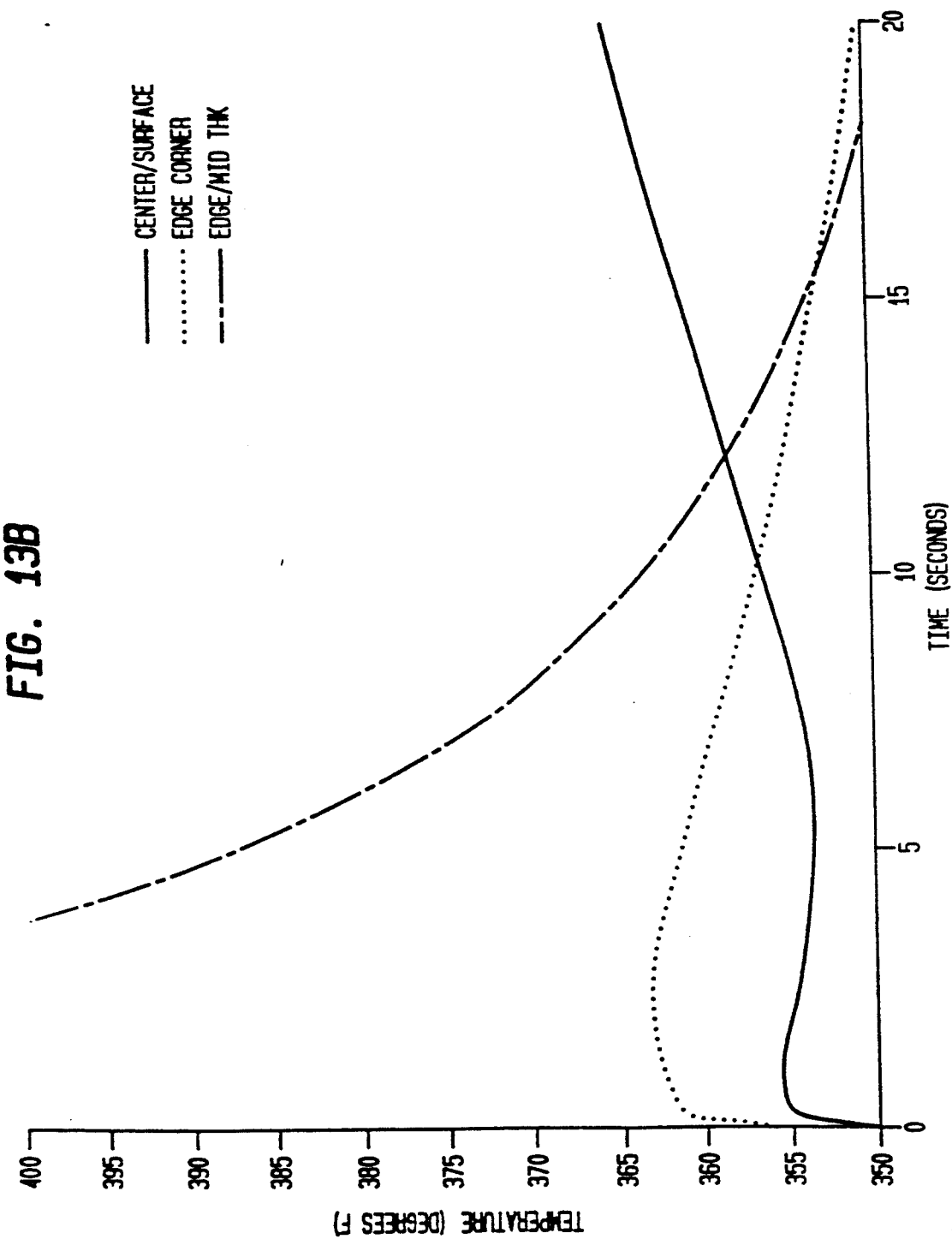

METHOD FOR MOLDING STRESS FREE AMORPHOUS AND CRYSTALLINE THERMOPLASTIC RESINS

CROSS-REFERENCE TO RELATED APPLICATIONS

This application is a continuation-in-part of application Ser. No. 07/472,080 filed Jan. 30, 1990, now abandoned, which is a divisional of application Ser. No. 07/191,173, filed May 6, 1988, now abandoned.

BACKGROUND OF THE INVENTION

The present invention relates to methods and apparatus for molding homogeneous articles from amorphous and crystalline thermoplastic resins, and, more particularly, to methods and apparatus which maintain high temperature for a period of time sufficient to relax a resin at its surface by providing a booster layer and to eliminate stress variations in the molded part without the need for adding and removing heat, multiple stations or additional processes such as annealing.

In almost all known molding operations, pressure and heat are applied to cause a plastic to flow into a desired shape. The shape is then fixed by cooling. Heating, flow under pressure and cooling under pressure are required in this sequence. Injection, compression, and blow molding are commonly employed production processes for molding large numbers of articles with reusable molds.

Injection molding is an automated process that is used to rapidly produce plastic molded articles. Compact audio discs, for example, are molded at a rate of 400 to 600 discs per hour from a single mold. The injection molding process has the following basic steps:

Step (1) Circulate fluid through the mold to bring it to the desired temperature.

Step (2) Close the mold.

Step (3) Force a molten thermoplastic resin through a small opening called a gate into the mold cavity that defines the molded article geometry until the cavity is filled.

Step (4) Cool the molded article until it is rigid enough to be removed from the mold.

Step (5) Open the mold and remove the molded article.

In many cases additional molten thermoplastic resin is packed into the mold cavity after Step (3) to compensate for the loss of resin volume as it shrinks during the cooling period. In other cases, the resin is compressed to compensate for the shrinkage that occurs after the gate is shut off. The gate may be shut off immediately after the cavity is filled.

The injection molding process has many advantages, but it also has several inherent problems, particularly regarding high precision molded articles that must have uniform properties throughout. High shear flow stresses are created in the molded article during injection. When the hot thermoplastic resin melt contacts the much colder mold cavity surface, a thin frozen region starts immediately to form. The plastic then continues to cool from the cold mold surface toward the center of the molded article. An intermediate layer is formed when the molecules in the melt contact the outer frozen region and freeze to it. Resulting high flow stresses cause these molecules to become oriented in the direction of flow. The intermediate layer is highly shear stressed. The outer and the intermediate layers together form a region referred to as 'skin.' The stresses are frozen in the skin and cannot relax. The thickness of the skin increases as the square root of resin contact time with the cold mold surface.

The time required for the molecular stresses to relax increases with decreasing temperature. For amorphous plastics, stress relaxation is almost impossible when the plastic is below its glass transition temperature. The central core of plastic melt flowing into the cavity is thermally insulated by the skin region. The core remains hot for a longer time than the skin, thereby providing the time it must be at an elevated temperature in order for reorientation of molecules in the core region to occur. The core region consequently has little flow-induced orientation and shear stress. The orientations and layers can be seen in FIGS. 1 to 3, which are taken from "The Interrelationship of Flow, Structure, And Properties In Injection Molding" by L. R. Schmidt, Corp. R&D, G.E., Schenectady, New York. In FIG. 1 a rectangular mold cavity 1 is shown being filled with molten plastic 2 through a gate 3. The hydrodynamic skin-core structure in the mold cavity 1 during filling is shown in FIG. 2, wherein the skin 4 of the plastic melt within the mold cavity at the top and bottom surfaces thereof thermally insulates the central core 5 of flowing plastic melt during filling of the mold. As shown in FIG. 3, the skin is formed of an outer layer, identified as zone I, and an intermediate layer which is highly oriented and highly shear stressed, identified as zone II. The core zone is identified as zone III in FIG. 3.

Under typical injection molding conditions, flow rates vary significantly throughout the cavity resulting in variable skin thickness. Mechanical and physical properties of the molded article vary considerably depending on the distribution of skin and core thicknesses as well as the degree of orientation and crystallinity at different locations in the molded article.

During flow, higher pressures in the core region cause higher shear stresses and molecular orientation in the intermediate layer as the core material is pushed through. When the cavity is completely full, pressure increases rapidly. High pressure is then maintained as the molded article continues to cool and the thickness of the frozen layer increases. The volume of the plastic decreases as it solidifies and the injection pressure packs in more plastic until the gate closes or pressure is removed. After the gate closes, the molded article continues to cool until the frozen layer is thick and rigid enough for molded article ejection. The pressure decreases as the molded article cools and the specific volume decreases. The outer frozen layer tries to maintain molded article dimensions while the core region continues to cool and shrink thus creating additional residual stresses in this known injection molding process. The greater the difference in temperature between the core and the surface, the higher the cooling stress.

Crystalline polymers also show the effects of flow-induced orientation. At temperatures above the melting temperature, a crystalline resin is amorphous. The resin injected at such temperatures contacts the cold mold surface and a thin oriented layer freezes forming some small crystalline regions. The crystals thus formed act as nucleating agents and because they are oriented, the crystals grown from them are also oriented. The intermediate and central core regions develop in much the same way as described for amorphous plastics.

Close tolerances are difficult to achieve in crystalline plastic molded articles formed by known injection molding processes because crystallization causes additional shrinkage and typical molding conditions cause large variations in crystallinity throughout the molded article. Crystal growth requires time and high mobility of molecules so that molecular segments can get close together and align themselves. V. M. Nadkarni et al., "Injection-Molding Semicrystalline Polymers", *Plastics Engineering*, August 1984 and S. Kenig et al., "Cooling Molded Parts—A Rigorous Analysis," *SPE Journal*, Vol. 26, 1970 describe how molding conditions influence crystallization. A high quench rate causes the onset of crystallization to start at a temperature below the crystalline melting temperature of the polymer. The crystallization onset temperature decreases with increasing quench rates. The rate of crystallization peaks over a narrow temperature range somewhere between the melting temperature and the glass transition temperature of the polymer. The specific heat of the resin increases significantly in this rapid crystallization temperature range. Ideally, the crystallization onset temperature should be near the temperature where the highest specific heat occurs in this temperature range. The resin should then cool slowly as it passes through the remainder of this temperature range, so that maximum crystallization occurs in the shortest period. Crystallization will also occur more readily under lower pressure because of increased molecular mobility. As discussed above, in known injection molding processes, the skin region and the core region cool at much different quenching rates which causes variable crystallization. The crystallization at the surface of the molded article will be less than at its center.

Several other problems are also inherent in the injection molding process. Molded articles with varying wall thicknesses will pack differently in different locations in the molded article. Overpacking occurs in areas of a molded article that fills too early and in a cavity of a family or multicavity mold that fill before the other cavities. Overpacking also occurs in the area near the gate wherein hot plastic is forced in with the relatively cool plastic. The overpacked areas are highly stressed and exhibit lower strength, warpage and hang-up in the mold. Common methods of reducing these problems include altering molded article wall thicknesses, relocating the gate, and profiling the injection pressure to reduce pressure during packing.

Differential densities, molecular orientations, thermal gradients, and crystallinity in plastic molded articles cause warping. In addition, weld lines are formed where two melt paths meet. If there are large enough temperature differences at the converging melt fronts, weak weld lines are formed. Conventional methods for minimizing this problem include adjusting gate locations, gate sizes or runner sizes. The molded article may even be redesigned to relocate the weld lines.

High precision and optical molded articles have additional molding problems due to the criticality of dimensional accuracy, homogeneity, and stability. It has been generally recognized in the literature (see, for example, page 34 of the second edition of "The Handbook of Plastic Optics", U.S. Precision Lens Inc., Cincinnati, Ohio) that all parts of a molded optic product must cool at the same rate during the cooling cycle to minimize molded article irregularity. To this end, molds have been built with heating and cooling passages for controlling cooling rate. Such sophisticated localized cooling and heating is costly, may be operator dependent and may not be uniformly effective.

Non-uniform stresses within a molded optical article also cause birefringence, which is the characteristic of having two indices of refraction with different values causing the separation of a light beam passing through the material into two diverging beams. Birefringence is a major problem in plastic molded optical articles such as lenses and optical discs. A linear relationship has been found to exist between orientation stress and birefringence. The greater the degree of orientation stress, the greater the birefringence. Both flow-induced orientation stress and stress caused by rapid cooling through the glass transition temperature with large temperature gradients, as in the known process of injection molding, cause birefringence.

The birefringence requirement for audio compact discs is 50 nanameters or less. Typical production discs exhibit birefringence of 20 to 30 nanameters. Similar optical disks used for computer data storage have even more stringent birefringence requirements. Shoji Ohsawa et al. "Thermosetting Resin Substrate For Computer Optical Memory Disk," 15 Nov. 1986/Vol. 25, No. 22 of Applied Optics make the following statements:

> Birefringence is one of the most important properties of optical disks substrates when used for computer memory units, as this property is directly related to the carrier-to-noise ratio (CNR) and bit error rate. In particular, a magnetooptical disk using a delicate Kerr rotation angle as a signal requires a birefringence of less than 5 nm (double pass), and nearly 0 must be targeted.
>
> The principle stress difference defined here is caused by (1) a heterogeneous residue of mold pressure and (2) and heterogeneity of mold shrinkage. In general, the higher the mold pressure and the larger the mold shrinkage, the more heterogeneous becomes the residual stress. This results in a larger principal stress difference. It is, therefore, necessary to minimize the residual stress for a minimum birefringence.

U.S. Pat. No. 4,879,082 describes a method for molding polycarbonate resin optical discs to achieve essentially zero birefringence. In doing so, however, this method purposely molds stresses into the molded product which must later be removed by annealing for five hours at a temperature between 100° C. and 120° C.

L. I. Johnson, "Strain Free Injection Molding," *Plastics Engineering* (June 1963) states that heating a mold to a temperature well above the solidification temperature of the resin significantly reduces the residual stress in the molded article. Several methods have been proposed to heat a thin layer of material at the cavity surface during the time resin is being injected into the mold and then quickly cool the thin surface layer to minimize the molding cycle time. For example, U.S. Pat. No. 4,338,068 describes a method for controlling heating and cooling of a thin layer of material at the mold surface to cause thin and thick walls in the same plastic molded article to solidify at about the same rate. The method has the following steps:

Step (1) Heat a thin layer of material that forms the mold cavity surface using an external energy source such as electrical resistance heating, with the thin and thick wall locations of the molded article being heated independently.

Step (2) Close the mold.

Step (3) Inject resin into the mold until the cavity is filled.

Step (4) Using heating and cooling means and associated controls, controllably heat the mold cavity surface layer until the molded article is substantially free of either injection induced or secondary flow induced stresses.

Step (5) Use fast response cooling means such as volume controlled variable conductance heat pipes to cool the molded article rapidly with the thin and thick wall locations of the molded article being cooled at different rates that are also varied over time.

Step (6) When the molded article is rigid enough, open the mold and remove it.

Expensive additional equipment and complicated controls are required to heat and cool the surface of the mold at the proposed times and at the proposed rates. Complication and expense are increased further when various locations are heated and cooled independently from one another for molding parts with varying wall thickness.

European Patent Application 0 202 372 describes a method for heating and cooling a very thin metal cavity surface layer. Pressurized fluid is circulated behind a thin metal cavity surface layer to prevent distortion of the surface layer by balancing the pressure exerted by the resin melt when it is injected into the mold cavity. In other words, the pressurized fluid must provide rigid structural support for a thin metal cavity surface layer. The process has the following steps:

Step (1) Heat a thin layer of metal at the mold cavity surface until it is above the glass transition temperature of the resin to be molded by circulating hot fluid in the cavity behind a thin surface layer of metal.

Step (2) Close the mold.

Step (3) Inject resin melt into the mold cavity while continuously adjusting the pressure in the heating fluid to balance the changing pressure exerted by the resin melt on the thin metal wall.

Step (4) Discontinue circulating hot fluid that heated the thin metal mold cavity surface layer when the cavity is filled and continuously adjust fluid pressure as in Step (3).

Step (5) Circulate cooling fluid in the cavity behind the thin metal surface layer to cool the resin and continuously adjust fluid pressure as in Step (3).

Step (6) Open the mold and remove the article when the molded article is rigid enough.

The steps for heating and cooling the thin metal cavity surface layer in this method are similar to the method used in U.S. Pat. No. 4,338,068. In addition to having the same disadvantages, however, the method entails the complexity and problems associated with controlling the pressures in the circulating fluid so that it balances the pressure of the resin. The resin pressure changes suddenly and drastically at various times in the injection molding cycle such as at the instant when the mold is completely filled. Very sophisticated equipment is required to balance the pressure on both sides of the thin cavity wall during rapid changes of resin pressure.

U.S. Pat. No. 4,285,901 describes a mold for regulating the cooling speed of the molten resin injected or placed in a mold cavity. The molding method has the following steps:

Step (1) Bring the mold to operating temperatures.
Step (2) Close the mold.
Step (3) Inject or place hot resin melt into the mold cavity where a passive insulation layer located behind a thin metal surface layer causes the mold cavity surface temperature to increase rapidly to a temperature that prevents a solid layer of resin from forming during the time the resin is flowing into the mold.

Step (4) Cool the resin until the molded article is rigid enough to be removed from the mold.

Step (5) Open the mold and remove the molded article.

Steps (1), (2) and (5) of this method were previously known. In step (3), the mold cavity surface is provided by a thin metal layer and a layer of heat insulating material located between the surface layer and the mold housing. The thin metal layer and the heat insulating layer are intended to cause the thin metal surface layer to be heated by the molten resin immediately when the resin is injected or placed into the cavity in order to inhibit, to the greatest possible extent, the formation of the solid resin layer that would otherwise occur upon injection or placement of the molten resin in the cavity. This method had the aim of improving transfer of the molding surface onto the resin, precluding or minimizing weld and flow marks, and producing an article with uniform and reduced residual stress.

Upon analytical examination of the immediately above-described prior art mold and molding method, however, it becomes clear that whenever two materials at different temperatures suddenly come into intimate contact with one another, the temperature at the contact surfaces immediately change to a common temperature that is somewhere between the two initial temperatures. The common surface temperature is determined by the thermal conductivities, densities, specific heats, and initial temperatures of the two materials. The surface temperature then remains constant while the temperatures within the two materials change as heat flows from one to the other until the temperature at the far side of one of the materials starts to change. Thus, the surface temperature of the thin metal surface will increase immediately, but only to a temperature determined by the hot resin melt and the metal of the surface layer. The surface temperature will remain at this temperature as though the insulation layer did not exist until heat starts flowing through the metal surface layer into the insulation layer. The surface temperature will then increase further over a period of time as the insulator drags the metal surface temperature along as its own temperature increases. The mold surface temperature does not increase immediately to the higher temperature as it would if the insulator formed the mold cavity surface.

To prevent a solid resin layer from ever forming during injection of the resin, therefore, the mold described in U.S. Pat. No. 4,285,901 must be at a high initial temperature. For example, if the surface temperature of the mold cavity must rise immediately to 300° F. so that it is slightly above the 295° F. glass transition temperature of a low viscosity polycarbonate that is injected at 620° F., the initial temperature of a nickel mold surface layer would have to be 289° F. Because the solidification temperature of 295° F. is only 6° F. above the initial mold surface temperature, the cooling time to solidify the molded article would be excessive. The mold cavity surface is not raised above the flow stress relaxation temperature for an extended period, so that stresses can relax, or so that, within the resin rapid crystallization range, crystallization can occur at or near the surface of the molded article.

The frozen skin thickness increases with time, narrowing the flow path and thus increasing resin shear rate and shear stresses. To reduce shear stresses, the injection time for precision molded articles is often very short. Injection time for compact audio discs, for example, is typically 0.25 seconds.

For step (4) of the method in U.S. Pat. No. 4,285,901, the kind and thickness of the insulating layer is determined so that cooling of the resin is not hindered after the cavity has filled up. Therefore, while step (3) helps reduce the creation of flow stresses caused by formation of a solid resin skin during injection, steps (3) and (4) do not bring cavity surface temperatures high enough and then hold them until the shear flow stresses that do develop relax. In addition, faster cooling creates new stresses when the molten center shrinks as it solidifies within a solid resin skin. In the initial stage of research, the patentees state that they conducted experiments using a thermosetting resin to provide the mold surface. The thermosetting resin although effective for heat insulation, was softened or damaged when exposed to the hot molten resin. This is a serious deficiency making it unsuitable for a production mold that must be used many times an hour for injection, compression, or blow molding. They abandoned using an insulating layer at the mold surface as unserviceable and turned to using a thin metal layer to provide the cavity surface. The method used in making this mold involves (1) preparing a master mold in the shape of the article to be molded, (2) forming a thin metal layer on the master mold, (3) forming a layer of heat insulating filled thermoset material over the thin metal layer, (4) forming a backing member over the insulating layer and (5) removing the master mold.

An experimental method for minimizing residual stresses in molded parts is described by Liou in his 1987 M.I.T. Phd Thesis in which he used a 0.01 cm thick coating of Teflon-S as a mold cavity surface layer in an experiment to raise its temperature during the injection period. He reported a reduction of birefringence of 40% compared to a bare metal mold operating at the same temperature, but found the Teflon to be unserviceable. He concluded that in addition to the required thermal properties and thickness for the layer, the materials used for the layer should also satisfy the requirements of good wear resistance, high melting point, good bonding strength to the cavity and smooth surface finish but acknowledged that material for the layer which meets all the requirements and has a low mathematical product of thermal conductivity, specific heat and density is yet to be developed.

U.S. Pat. No. 4,340,551 describes a method which selectively heats a superficial layer of a mold cavity surface using high-frequency induction heating for the purpose of molding articles that are superior in surface gloss and exhibit no surface defects by forming a very thin pure resin surface layer to avoid dents and pits caused by filler materials. Induction heating of a thin iron rich surface layer to a temperature above the heat distortion temperature of the thermoplastic resin prior to injecting the resin into the mold was proposed to achieve this purpose. The conventional injection molding cycle is then used. This method cannot, however, substantially reduce the residual stresses in the molded article, particularly at or near the surface. A solid resin skin and shear flow stresses are created during injection and cannot relax because the mold surface temperature is below the glass transition temperature of the resin.

U.S. Pat. No. 4,054,679 describes a method for injection molding a parison that is later blow molded into biaxially oriented carbonated beverage bottles in which the full thickness of a core pin is kept at a temperature well above the solidification temperature of the resin throughout the injection molding process. The injection molding portion of the process purposely creates thermal and stress gradients in the parison wall to compensate for the differences in stresses between the inner and the outer surfaces of the parison wall that are caused by the subsequent blow molding operation, which stretches the parison wall. The core pin that defines the inner surface of the parison is maintained at a temperature well above the resin solidification temperature throughout the injection molding process while the outer surface is cooled and solidified. When the outer surface is rigid enough for the parison to be handled, the parison is removed from the mold. The inner surface is still fluid or semi-fluid when the parison is removed. This is a very specialized process that purposely creates stress gradients in the molded article and is not suitable for producing high precision or optical molded articles where the goals include producing homogeneous molded articles with minimum residual stresses.

Methods for molding precision optical lenses have also been proposed. For example, U.S. Pat. No. 4,364,878 describes a method for molding optical lenses that combines injection and compression molding according to the following steps:

Step (1) Heat die inserts to or slightly below the glass transition temperature of the resin.

Step (2) Close the mold with the dies separated so that the mold cavity volume is larger than the volume of the finished lens.

Step (3) Inject a mass of resin equal to the mass of the finished lens into the oversized cavity using low pressure.

Step (4) Press the dies together to coin the resin mass to completely fill the resulting cavity.

Step (5) Controllably cool the lens so that all points in the lens cool to the glass transition temperature substantially at the same time.

Step (6) Open the mold and remove the lens.

Because the dies in the above-described method are at or slightly below the glass transition temperature of the resin, flow stresses will be created and cannot be relaxed. The mechanism used to controllably cool the lens is the insertion of plugs of different thermal conductivities into the dies. This will provide somewhat more even cooling between thinner and thicker locations of the lens; however, the surface of the lens will solidify long before the center. Because the mold cavity surface temperature is so close to the solidification temperature of the resin when the resin is injected, the temperature gradients through the lens thickness are very large at the onset of solidification. This creates additional residual stresses as the solidifying center region shrinks within the already solidified surface of the molded article. The coining step also requires additional moving parts, including a hydraulic actuator and hydraulic circuit.

U.S. Pat. No. 4,836,960 describes a combination of injection and compression molding in the following steps:

Step (1) Heat mold dies well above the glass transition temperature of the resin.

Step (2) Inject resin melt into the mold.

Step (3) Bring dies together to force excess resin out of dies.

Step (4) Slide both dies together inside a mold sleeve to close the resin entrance port.

Step (5) Cool the lens to the glass transition temperature.

Step (6) Move the mold to another station for further cooling.

Step (7) Remove dies from sleeve and allow the lens to cool until it shrinks free of the mold sleeve.

This process requires several work stations, a great amount of handling, and excessive cooling time. The cooling time is due to the need to cool the entire mass of the mold dies and is much longer than is required for the resin to relax. It takes ten minutes to cool to the glass transition temperature before the mold is moved to the next station where it cools further until it can be handled.

The injection/compression molding method is also common in optical disc molding. By injecting the molten resin into an oversized cavity, the flow path is widened, thereby reducing the shear rate and thus shear stresses in the resin. After the cavity is filled, pressure is maintained on the cavity dies, so that they compress the resin and follow it as it shrinks. Although this method does reduce flow stresses somewhat, the cold cavity walls cause a solidified or frozen skin to form immediately and creates significant stresses that are acceptable for audio discs but are not acceptable for rewritable data storage discs.

SUMMARY OF THE INVENTION

Accordingly, it in an object of my invention to provide improved methods and molds thereof for:

(a) molding articles that have very little to no residual stress from flow or from cooling even at the surface of the articles;

(b) molding articles that have greater and more uniform crystallization through the wall thickness even at the surface of the articles;

(c) molding articles that have improved dimensional accuracy and stability;

(d) molding lenses and optical disks that have little or no birefringence; and (e) molding articles that start to solidify with very low temperature gradients through the wall thickness even if there are large variations in the wall thickness.

The foregoing object has been achieved in accordance with the present invention without the need of equipment and controls to cyclicly heat and cool the mold dies at variable rates. In particular, the present invention involves a method and an apparatus for molding a thermoplastic part which performs the following sequence of steps:

(a) providing a mold containing first and second mold portions which are joined together to form a mold cavity in the shape of an article to be molded, each respective mold portion comprising:

(1) one or more non-metallic thermal flow control insulator elements of predetermined thicknesses that form cavity surfaces of a mold, the insulator elements being made of materials that have much smaller mathematical products of thermal conductivity, density, and specific heat than tool steel, preferably one-tenth or less that of tool steel, and the durability for use as the cavity surfaces of a production mold, preferably the materials are selected from the group consisting of quartz glass, pyrex glass, sapphire, and polyimide thermoplastic, whereby upon direct contact by molten plastic the insulator elements cause temperatures at cavity surfaces to immediately increase several times as much as they would if a metal mold is used;

(2) dies adjacent to and in thermal communications with the insulator elements, said dies providing structural support to the insulator elements;

(3) thermal means for applying substantially constant temperature control stimuli to said dies;

(b) applying substantially constant temperature control stimuli to mold dies throughout the molding cycle, the control stimuli being adjusted until, after many molding cycles the cavity surfaces are at predetermined temperatures that are below the solidifying temperature of the thermoplastic just prior to contact by molten thermoplastic;

(c) increasing temperatures of the cavity surfaces by introducing molten thermoplastic into direct contact with the cavity surfaces of the insulator elements and using heat flowing from the molten plastic into the insulator elements in cooperation with said predetermined temperatures to immediately heat the cavity surfaces to temperatures that relax substantially all flow stresses from the molten thermoplastic in a predetermined short time, preferably temperatures are chosen that relax flow stresses in 3 to 5 percent of the time elapsed from introduction of molten thermoplastic until the mold is opened;

(d) after the cavity is filled, using heat flowing from the molten thermoplastic in cooperation with predetermined thicknesses of the insulator elements to hold the cavity surfaces for said predetermined short time at or above temperatures that relax substantially all flow stresses, whereby flow stresses are virtually eliminated throughout a molded thermoplastic article, particularly at and near its surfaces.

(e) after the flow stresses are relaxed, using and thermal resistance of the insulator elements of said predetermined thicknesses in cooperation with declining heat flow from the molten thermoplastic to reduce temperatures of the cavity surfaces toward but above the temperature where the molten thermoplastic solidifies while the molten thermoplastic that is not in contact with the cavity surfaces cools faster thereby greatly reducing the temperature gradients through the molten thermoplastic, after which the cavity surfaces fall below the temperature where the thermoplastic solidifies, whereby, due to the small temperature gradients throughout the molded article when solidifying begins, stresses caused by uneven thermal shrinkage are virtually eliminated.

The respective thermal flow control properties of the one or more types of thermal flow control insulator elements correspond to respective mathematical products of thermal conductivity, specific heat and density. The dies preferably comprise metallic elements having associated heat transfer fluid channels therefor through which heat transfer fluid is passed to bring the temperature of the metallic elements and thereby the plurality of thermal flow control insulator elements to the predetermined temperature. Other means for adding heat to or removing heat from the dies may be used.

The mold may also include backing thermal flow control insulator layers adjoining the thermal flow control insulator elements and the heat transfer elements, the backing thermal flow control insulator layers having thermal flow control properties different from those of the plurality of adjoining thermal flow control insulator elements. The thermal flow control properties of the backing thermal flow control insulator layers correspond to mathematical products of thermal conductivity, specific heat and density, which products are less than mathematical products of thermal conductivity, specific heat and density of the plurality of thermal flow control insulator elements.

When used in the manufacture of parts that have variations in thickness, such as a molded lens, the insulator elements and backing insulator layers are thickened or thinned at various locations to cool the molten thermoplastic more uniformly. Preferably the backing insulator layers are thickened where the insulator elements are thinned and are thinned where the insulator elements are thickened.

BRIEF DESCRIPTION OF THE DRAWINGS

FIG. 6 is a cross-sectional view through an injection mold according to a second embodiment of my invention;

FIG. 7B are curves showing the temperature histories of the cavity surface and the center of a polycarbonate disk as it cools in a conventional all metal mold;

FIG. 8A is a diagram similar to that of FIG. 7A showing the thermal analysis using an injection mold according to my invention exemplified in FIG. 5 to raise the temperature of the mold cavity surface and to maintain that surface at or above a temperature that relaxes the stresses through the entire thickness of the resin;

FIG. 8B is a diagram similar to that of FIG. 7B showing the temperature changes as a function of time for the cavity surface and the center of a polycarbonate disk as it cools using a mold of my invention as exemplified in FIG. 5;

FIG. 9A is a diagram similar to that of FIG. 7A showing the thermal analysis of the mold of FIG. 6 to raise the temperature of the mold cavity surface and maintain it for a time period above the crystallization temperature range of the polyethylene resin to relax stresses in the resin and to then cause the cavity surface temperature to pass slowly through the crystallization range to cause much more uniform crystallization throughout the thickness of the article;

FIG. 12 is similar to FIG. 11 except that it relates to a time when the lens is completely solid;

FIG. 13B is an enlarged view of the temperature histories of FIG. 13A for the first 20 seconds after the mold is contacted by the hot polycarbonate.

DETAILED DESCRIPTION OF THE DRAWINGS

Figure 5:
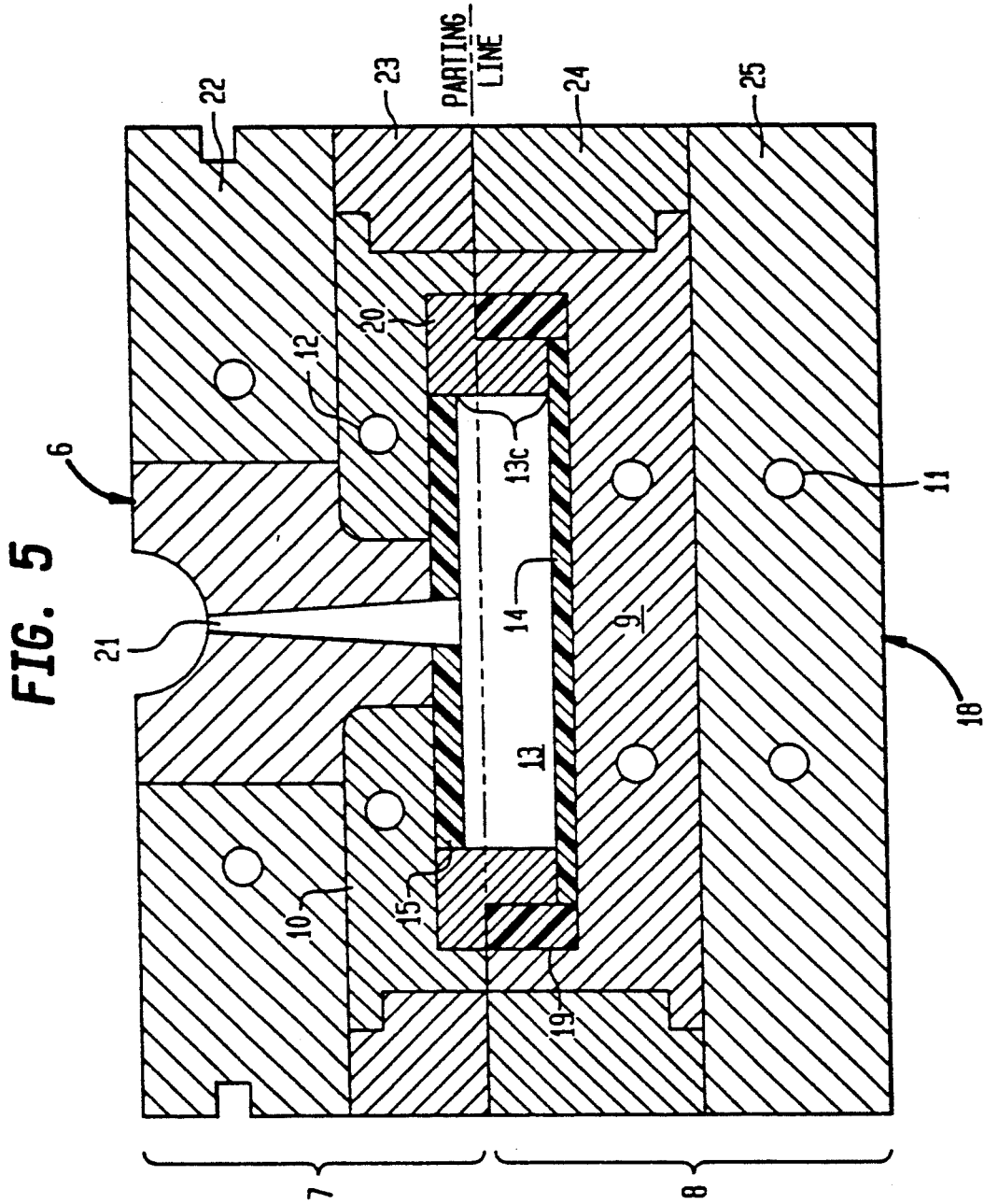
FIG. 5 is a cross-sectional view through an injection mold according to a first embodiment of my invention for making an optical disk.

A first embodiment of my invention is diagrammatically shown in FIG. 5 as comprising an injection mold 18 having a pair of mold halves 7 and 8. For purposes of an exemplifying embodiment, the shape of the part to be formed will be assumed to be generally cylindrical, with the cross-sectional illustration of FIG. 5 passing through a diameter of the cylinder. Each generally cylindrical mold half 7, 8 includes a die in the form of metal inserts 9, 10, respectively, which are provided with heat transfer fluid channels 11 and 12 or other devices for maintaining dies 9 and 10 at desired temperatures. When the mold halves 7, 8 are placed adjacent to one another as shown in FIG. 5, they define a mold cavity 13 in the shape of the desired molded article.

Non-metallic thermal flow control elements 14, 15 are located on respective upper and lower generally circular surfaces of dies 9, 10 and define upper and lower surfaces of the mold cavity. Thermal flow control elements 14, 15 are made of materials such as quartz glass, polyimide thermoplastic, sapphire, Pyrex glass, etc., that have very low mathematical products of thermal conductivity, specific heat, and density and yet the desired hardness, wear, chemical and thermal resistance required for the polymer being molded. These thermal control materials have the durability for use as a cavity surface layer in production molding processes that the prior art tried unsuccessfully to find. In addition, thermal flow control insulator elements 14, 15 can be bonded or clamped in place when used to make articles of simple geometry such as optical disks and lenses, which is a much simpler and cheaper arrangement than the method for making the mold in U.S. Pat. No. 4,285,901. The thermal flow control elements 14, 15 can also be machined before or after bonding or clamping in place.

For more complicated geometries, thermal flow control insulator elements 14, 15 may first be formed by blow molding, compression molding or other means. Adjoining thermal flow control insulator elements 14, 15 are thermal flow control edge elements 19, 20 which are made of non-metallic materials the same as or similar to that of thermal flow control insulator elements 14, 15. For the exemplary cylindrical shape of the mold cavity, edge element 20 is generally annular-shaped, so as to define the cylindrical wall of the mold cavity.

When selecting the materials for the thermal flow control insulator elements 14, 15 and edge elements 19, 20, the materials chosen for the edge elements 19, 20 should have much lower mathematical products of thermal conductivity, specific heat, and density than the materials chosen for the thermal flow control insulator elements 14, 15. This difference is necessary because corners of the molded article, defined by corners 13C of the cavity 13 (whereat the cavity sidewalls formed by edge piece 20 intersect the top and bottom surfaces of the cavity, i.e. the surfaces of thermal flow control insulator elements 14, 15), have more surface area per volume of resin from which to transfer heat than do the upper and lower surface regions and cylindrical wall regions. Thermal control edge elements 19, 20 cause reduced heat flow at the cylindrical corners of the cavity more than the thermal flow control insulator elements 14, 15 cause at the upper and lower surfaces and the cylindrical wall, thereby slowing heat transfer from the edges, so that it is closer to the heat transfer rate at the walls and thus preventing the corners of the molded article from solidifying much before the upper and lower surfaces and the cylindrical wall.

A central opening 21 at the entrance to sprue bushing 6, which extends through the metal insert 10 and thermal flow control element 15, provides a port for molten plastic under pressure to enter cavity 13 during injection molding. Clamping plate 22, "A" plate 23, "B" plate 24 and support plate 25 are typical of standard mold bases.

Another generally cylindrically shaped mold, according to a second embodiment of the invention, is shown as mold 28 in FIG. 6. Mold 28 of FIG. 6 is like mold 18 of the embodiment of FIG. 5, but with the addition of backing thermal flow control layers 16 and 17. Backing thermal flow control layers are necessary when the highest cavity surface temperature that can be achieved using thermal flow control layers 14 and 15 alone is not high enough for relaxation of flow stresses unless cavity surface temperatures just prior to contact by molten resin are too high, for example above the heat distortion temperature of the plastic. This assumes the materials selected for layers 14 and 15 are required for wear, rigidity, non-sticking, etc. Backing thermal flow control layers 16 and 17 have much lower mathematical products of thermal conductivity, specific heat and density than do elements 14 and 15. However, because they are not contacted by the hot molten resin, they have less stringent requirements for hardness, wear resistance, smooth surface finish and non-sticking.

Figure 10:
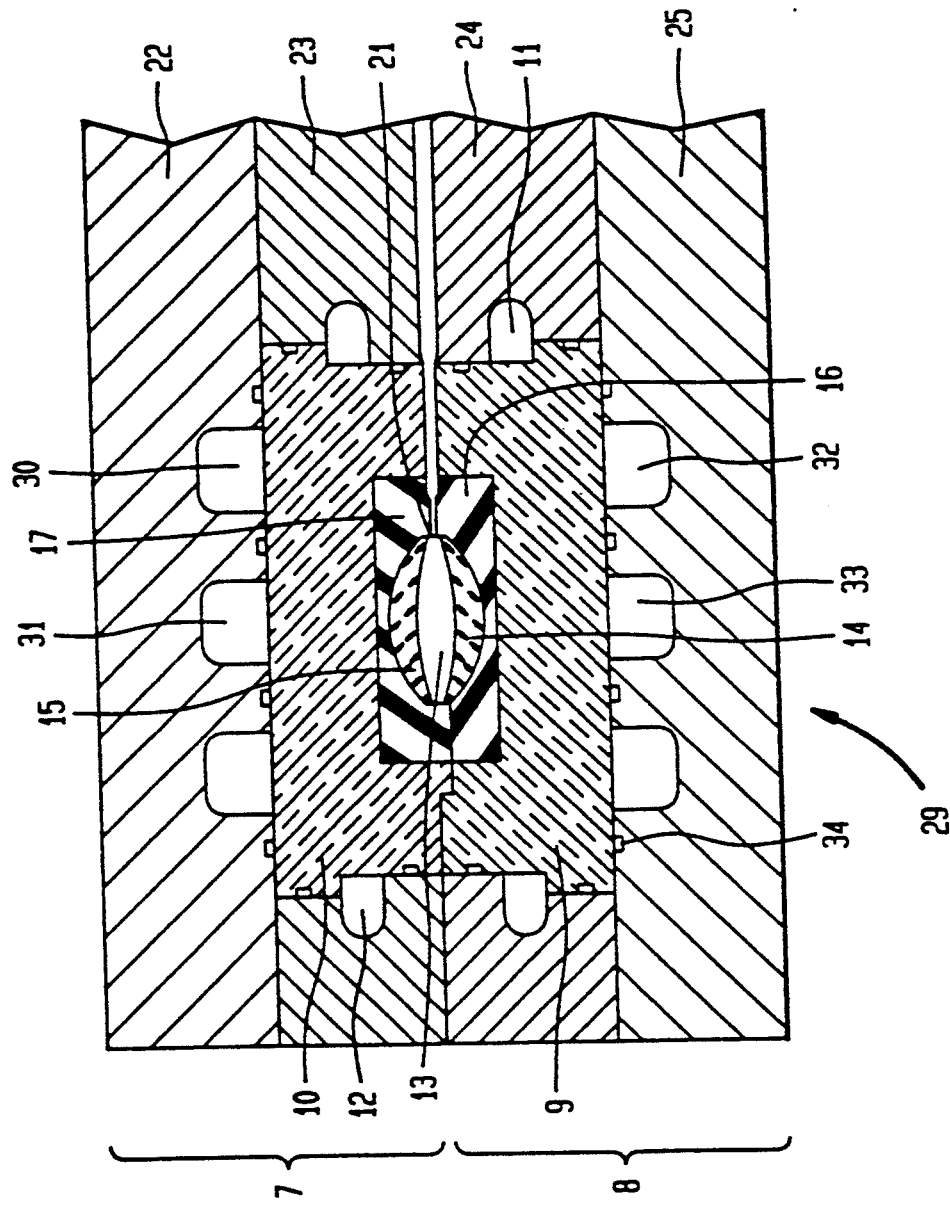
FIG. 10 is a cross-sectional view through an injection mold according to a third embodiment of my invention.

A further mold, according to a third embodiment of the invention, is shown as mold 29 in FIG. 10. Mold 29 may be used to make optical lenses or other molded articles that have large variations in wall thickness. A significant difference from the prior art is the fact that mold 29, like mold 28 in the embodiment of FIG. 6, employs thermal backing layers 16 and 17 in order to reduce heat flow at thinner wall locations, particularly at the corners, while preserving the continuity of the cavity surface. The continuity of the cavity surface is extremely important for the formation of precision parts, such as optical parts. Thermal flow control layers 14 and 15 are made as thin as practicable at their edges in order to maximize the effects of thermal backing layers 16 and 17. As in the second embodiment, thermal backing layers 16 and 17 are made from materials that have much lower mathematical products of thermal conductivity, specific heat and density than do thermal flow control elements 14 and 15. However, because they are not contacted by the molten resin, they have less stringent requirements for hardness, wear resistance and smooth surface finish.

When any thermoplastic article is molded, it cools, as previously discussed, from the mold surface inward. Therefore, at any given time during cooling and solidification, the surface of the molded article is at a lower temperature than the rest of the molded article. My invention uses the heat from the hot resin melt to bring the surface of the mold cavity to a temperature above the flow stress relaxation temperature of the resin and to hold it there for a time period long enough to relax flow stresses in the resin. Since the resin that is not at the surface of the molded article is at a temperature higher than the temperature of the surface of the molded article, any flow stresses in it will also relax. If the resin is crystalline, my invention is designed to then cool the article slowly as it passes through the rapid crystallization temperature range. Finally, it continues to cool the surface slowly to reduce temperature gradients through the thickness of the article when it starts to solidify.

The process according to my invention is as follows. As explained previously, design and molding parameters, including temperatures, time periods and material properties to be employed in the process are initially defined, depending upon the particular application. I have found the following procedure to be an efficient way to determine key design and molding parameters. Amorphous polycarbonate thermoplastic will be used as an example.

PRELIMINARY STEP 1

Estimate the approximate cooling time (time period 't' from when the mold is completely filled until the mold is opened). This may be one and one-half to three times the minimum cooling time determined by the following equation:

$$t = (-d^2)/(\pi^2 \delta_r) \log_e [\pi(T_e - T_m)/4(T_r - T_m)]$$

where:
t = time
d = part thickness
$\delta_r$ = thermal diffusivity of resin
$T_e$ = ejection temperature of part
$T_m$ = temperature of mold cavity surface the instant before it is contacted by the molten resin
$T_r$ = injection temperature of the resin The following should be noted:

1. Every thermoplastic has a temperature above which it degrades. This limits the maximum value for $T_r$.

2. An initial estimated value of 20 F. to 30 F. below the glass transition temperature of the resin is suggested for $T_m$. For polycarbonate, whose glass transition temperature is about 300 F., 270 F. is chosen.

PRELIMINARY STEP 2

Choose the time period allowed for relaxation of flow stresses in the resin. This time period should be 3 to 15% of the cooling time estimated in preliminary step (1). Five percent has been found to be a good first trial percentage. For example, if the cooling time estimated in preliminary step (1) is 14 seconds, 0.7 seconds is a suitable first trial value for the flow stress relaxation period.

PRELIMINARY STEP 3

From relaxation time versus temperature data for the resin, choose a mold cavity surface temperature that will relax flow stresses in the resin within the time period chosen in preliminary step (2). For polycarbonate, FIG. 4A was used to select 380 F. as a mold cavity surface temperature that will relax flow stresses in less than 0.7 seconds.

PRELIMINARY STEP 4

Using the following equation, determine the thermal flow control properties for the non-metallic thermal flow control element.

$$(kpc)_m = ((T_e - T_m)/(T_R - T_m) - 1)^2 (kpc)_r$$

where:
k=thermal conductivity
p=density
c=specific heat
$T_R$=resin flow stress relaxation temperature subscript
  m=material of which thermal flow control element is made
subscript r=resin material For the present polycarbonate example, let:

$$T_R = 380 \text{ F.}, T_r = 680 \text{ F.}, T_m = 270 \text{ and}$$

$$(kpc)_r = 4.5 \times 10^{-8} \text{ (Btu-Lb)/sec-in}^4-\text{F}$$

Substituting these values, one calculates $(kpc)_m$ at $3.35 \times 10^{-7}$, which is the maximum acceptable value for the material.

Quartz with a kpc value of about $3.2 \times 10^{-7}$ is acceptable. Sapphire, whose value is about $9.5 \times 10^{-7}$ is not acceptable.

PRELIMINARY STEP 5

Using the following equation, estimate the maximum thickness of the non-metallic of thermal flow control insulator element.

$$X_m = (\delta_m/\delta_r)^{\frac{1}{2}} \times (0.5d)$$

where:
$X_m$=thickness of non-metallic thermal flow control element
$\delta_m$=thermal diffusivity of non-metallic thermal control element
$\delta_r$=thermal diffusivity of resin
d=thickness of part For the present polycarbonate example, let:

$$d = 0.048 \text{ inch}, \delta_m = 15.6 \times 10^{-4} \text{ in}^2/\text{sec}$$

$$\delta_r = 1.49 \times 10^{-4} \text{ in}^2/\text{sec}$$

Substituting values into the equation, $X_m = 0.078$ inch.

Twenty to one-hundred percent of this thickness should be used. The cooling time increases with this thickness. About 0.77 $X_m$ or 0.060 inch is used in Example 1 of the invention to be described in detail below.

PRELIMINARY STEP 6

Determine the temperature of the die that will cause the temperature of the mold cavity surface the instant before it is contacted by the molten resin ($T_m$) to be the temperature chosen in preliminary Step (1) of the inventive process. This temperature is affected by the mold cavity temperature at the time the molded part is separated from this surface, by the convection and radiation heat transfer while the mold is open, the various thicknesses and materials between the mold cavity surface and the temperature control stimulus and by the constant temperature where the thermal communication takes place between the temperature control stimulus and the die. This constant temperature is determined by trial and error through experimental mold cycles, which is a well known technique, and may be estimated by computer simulation of many cycles.

PRELIMINARY STEP 7

Repeat preliminary steps 1 through 6 as necessary to achieve the desired performance described in steps 1 through 6 that follow.

With process parameters thus defined by the above preliminary steps, the following sequence of steps is carried out:

Step (1) Circulate heat transfer fluid through the channels 11 and 12 to bring the mold halves 7 and 8 to the desired temperature and continue to circulate the fluid at this fixed temperature throughout the remainder of the molding cycle.

Step (2) Close the mold by bringing mold halves 7 and 8 together to form cavity 13.

Step (3) Inject hot resin melt into the mold cavity 13 where thermal flow control elements 14 and 15 and thermal flow control edge elements 19 and 20 that form the surface of the cavity cause the heat from the hot resin to immediately raise the temperature of the cavity surface to or above a temperature that relaxes any stresses in the resin within a selected time period.

Step (4) Maintain the temperature of the mold cavity surface at or above chosen relaxation temperature for at least the time period required for stress relaxation in the resin at that temperature.

Step (5) Cool the article being molded at a rate that greatly reduces thermal gradients in the article at the time that the surface of the article starts to solidify. If the resin being molded is crystalline, the cavity surface is also cooled slowly as it passes through the rapid crystallization temperature range. The cooling rate is controlled by the thicknesses of the thermal control materials.

Step (6) When the part is rigid enough, remove it from the mold.

This method produces less residual stresses and more uniform crystallization than was previously achievable in a economically short time period.

Step (3) of my method heats the cavity surface immediately upon contact with the hot resin to a temperature where stresses within the resin relax quickly. The cavity surface is heated using heat from the resin itself and does not require external energy to be added and then later removed. It also eliminates the need for complicated and expensive equipment and controls to first heat and then cool the cavity surface.

My invention further overcomes the cavity surface layer durability problems that have occurred when insulation materials were used as surface layers and that heretofore were unsolved. As noted above, thermal flow control edge elements 19, 20 have much lower mathematical products of thermal conductivity, specific heat and density than the surface thermal flow control insulator elements 14, 15. This causes less heat flow at corner regions than would be possible if the same material were used at the edges as is used at the cavity surface. The result is more uniform temperatures throughout the molded article.

Figure 1:
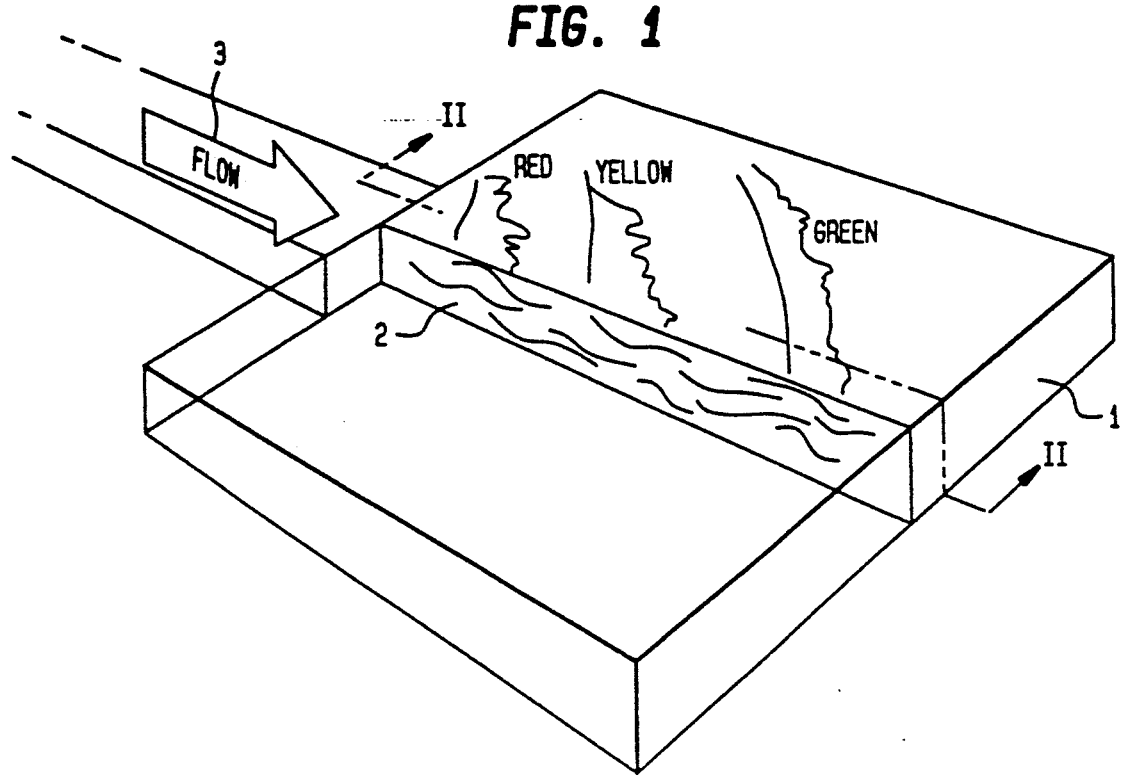
FIG. 1 is a previously discussed schematic of the filling dynamics for flow of molten plastic into a rectangular cavity according to a known injection molding process.
Figure 2:
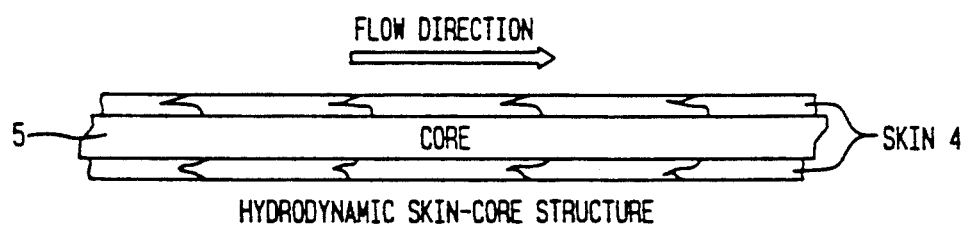
FIG. 2 is a previously discussed schematic of the cross-section of the molded article made in the mold of FIG. 1 taken along the line II—II of FIG. 1 and illustrating hydrodynamic skin-core structure.
Figure 3:
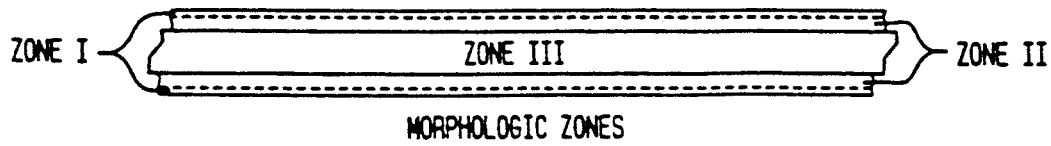
FIG. 3 is a previously discussed schematic of the cross-section of a molded article similar to that of FIG. 2 illustrating morphologic zones and zone formation.
Figure 4A:
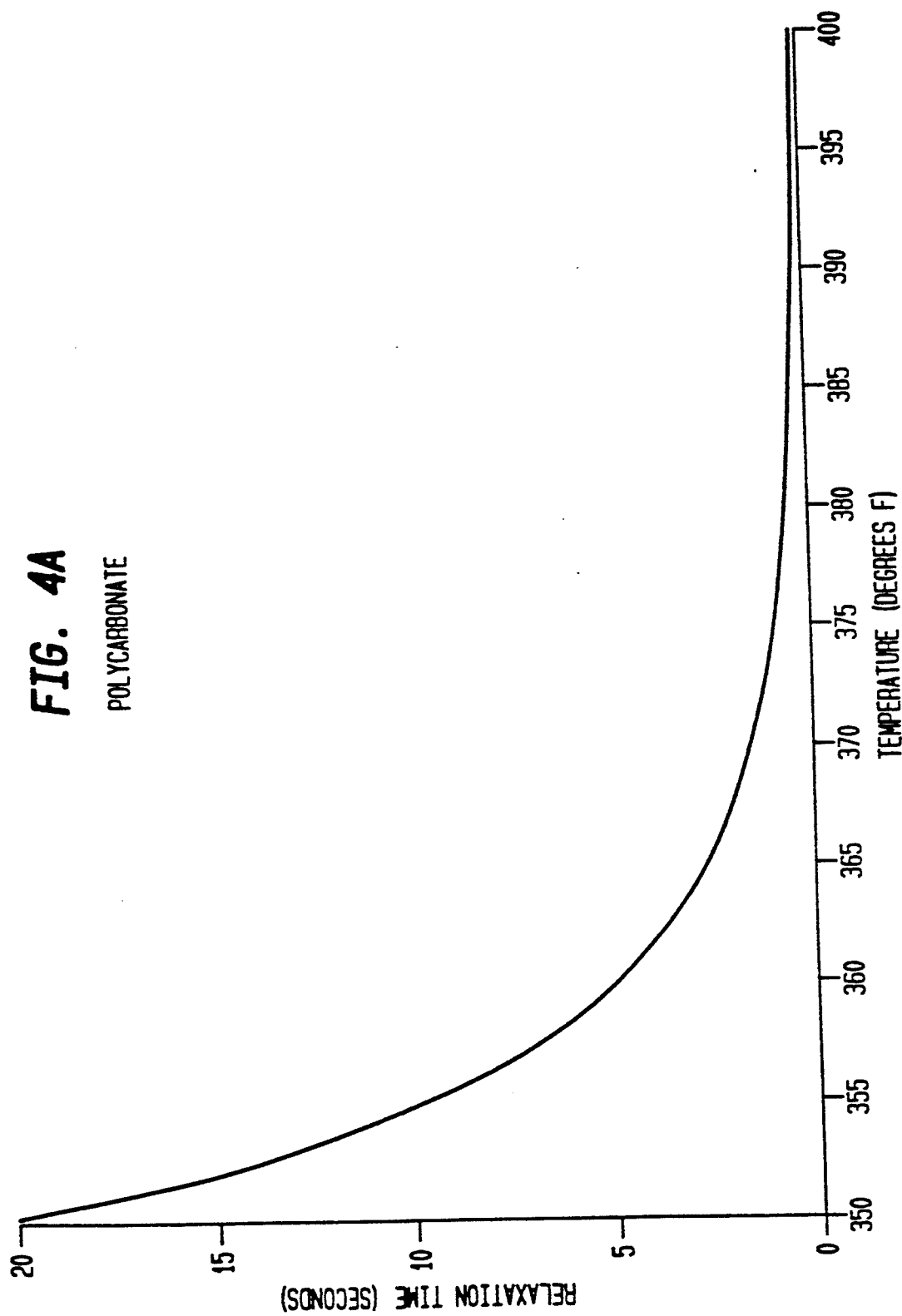
FIGS. 4A and 4B are curves showing the relaxation times for polycarbonate and for polystyrene at selected temperature ranges.
Figure 4B:
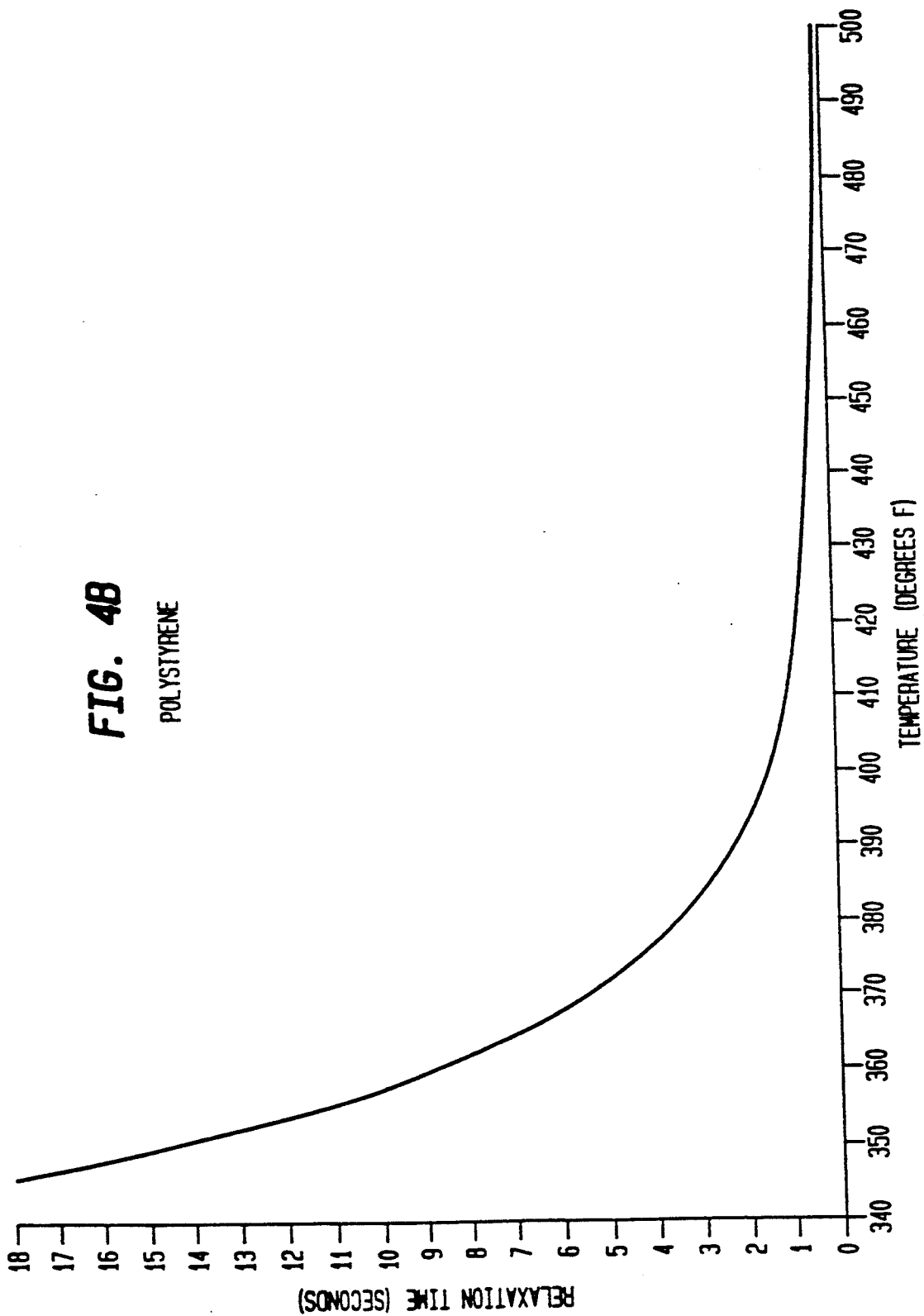

In his above-referenced 1987 M.I.T. Ph.D. Thesis, Liou describes an experiment where a Teflon-S cavity surface coating reduced flow stresses in an injection molded polystyrene part, but had little effect on the flow stresses at the surface of the part. In this experiment, under the supervision of Professor Nam P. Suh, who was issued U.S. Pat. No. 4,338,068, the mold surface temperature reached a maximum of 253° F. and cooled to the 221° F. glass transition temperature in 5 seconds. Using formulas and material test data from aforementioned "The Birefringence Problem in Optical Disk Substrates: A Modeling Approach", J. Greener et al, AIChE Journal (March 1989), and "Orientation Residual Stresses and Birefringence in Injection Molding", J. Greener and G. H. Pearson, Journal Of Rheology, 27(2), 115-134 (1983), the temperature at which polystyrene or polycarbonate would have to be maintained for a given time in order to cause flow stresses to relax can be estimated. As previously noted, the curves of FIGS. 4A and 4B provide this same information in the form of curves for selected temperature ranges.

In order to relax flow stresses in the polystyrene molded by the Liou process within a period of five seconds, the cavity surface must be maintained at a temperature of 370° F., which far exceeds the 253° F. maximum temperature from which the polystyrene was cooled down to 221° F. at the end of the five second interval. Consequently, the method of Liou is incapable of relaxing surface flow stress near the surface. Indeed, if one desired to relax flow stresses created in the polystyrene injection molded part according to the Liou process (something which Liou neither teaches nor suggests), the maximum mold cavity surface temperature of 253° F. (which is only 32° F. above the solidification temperature of polysytrene) would have to be maintained for a period of time on the order of 7300 seconds (in excess of two hours), which is prohibitive in the context of a commercially practical injection molding run.

It will be appreciated, therefore, that the prior art methods described above are inadequate to significantly reduce stresses at or near the surface of a molded article within a reasonable period of time. In effect, such methods either 1-simply prevent a solid resin layer from forming during mold fill, 2-bring the mold surface temperature above the glass transition temperature, 3-bring the mold surface temperature to the heat distortion temperature which is even lower than the glass transition temperature, 4-bring the mold surface temperature slightly below the glass transition temperature, or use complex equipment to cycle cavity surface temperatures.

Where a prior art method cools the mold rapidly, as soon as the mold is filled, there is insufficient time to allow the resin at or near the surface of the molded article to be maintained at an elevated temperature so that it can relax. Moreover, no prior art method promotes crystal growth at or near the surface of a crystalline plastic molded article.

Step (4) uses the heat from the resin melt to maintain the cavity surface temperature at or above the resin relaxation temperature for the time period required to relax stresses within the resin. Because the method described, for example, in U.S. Pat. No. 4,836,960 heats the entire metal die using an external energy source, the cooling time required is well in excess of that needed to relax any stresses in the resin if the relaxation temperature is indeed achieved. The cooling time is in fact at least two times longer than is required by my invention.

Step (5) cools the cavity slowly as it passes through the rapid crystallization temperature range of a crystalline thermoplastic resin. This reduces the quench rate and provides sufficient time over the span of the crystallization temperature range, so that crystal growth is promoted at the surface of the molded article. The result is much more uniform crystallization throughout the molded article than was previously achievable. Step 5 also cools the cavity surface slowly, so that the center of the wall of the molded article continues to cool faster than the surface thereby resulting in much reduced temperature gradients through the wall at the time solidification begins.

In addition to the above, mold 28 of FIG. 6 and mold 29 of FIG. 10 cause additional cavity surface temperature increases after heat starts flowing into the backing thermal flow control layers 16, 17. First, the temperature at the surface of thermal control layers 14, 15 increase immediately to a temperature determined by the hot resin melt and by the material and the initial temperature of thermal flow control insulator elements 14, 15. The surface remains at this temperature as though layers 16, 17 did not exist until heat starts flowing into layers 16, 17. The local cavity surface temperature will then increase further as layers 16, 17 become effective. This temperature increase is due to the backing thermal flow control layers 16, 17 offering more resistance to heat flow than the thermal flow control insulator elements 14, 15. When heat begins to flow into the backing layers 16, 17, less heat flows from the thermal flow control insulator elements 14, 15 to the backing layers 16, 17 than flows into the thermal flow control insulator elements 14, 15 from the molten resin. Heat builds up in the thermal flow control elements 14, 15, thereby further increasing its temperature, which reduces the heat flow from the resin to the thermal flow control insulator elements 14, 15 and increases the heat flow from the thermal flow control elements into the backing layers 16, 17 until the heat flows from the resin to the thermal flow control insulator elements 14, 15 is equal to the heat flow into the backing layers 16, 17. This effect diminishes as the thickness of thermal flow control insulator elements 14, 15 increases until a thickness is reached where the heat absorbed from the hot resin by thermal flow control insulator elements 14, 15 does not leave enough heat flow into layers 16, 17 to cause the cavity surface temperature to increase further. Mold 29 takes advantage of this effect by thinning thermal flow control insulator elements 14, 15 as they approach the corners of the molded article. This increases the cavity surface temperature at and near the corners to cause very small temperature gradients during solidification of the molded article.

Thermal analyses of a conventional all metal mold and of molds according to my invention were performed for both crystalline and amorphous plastics using a personal computer and commercially available finite element analysis software, particularly the NISA II Program. The computer models are one dimensional for all simulations except the double convex lens, which is an axisymmetrical two dimensional model.

EXAMPLE 1

Figure 7A:
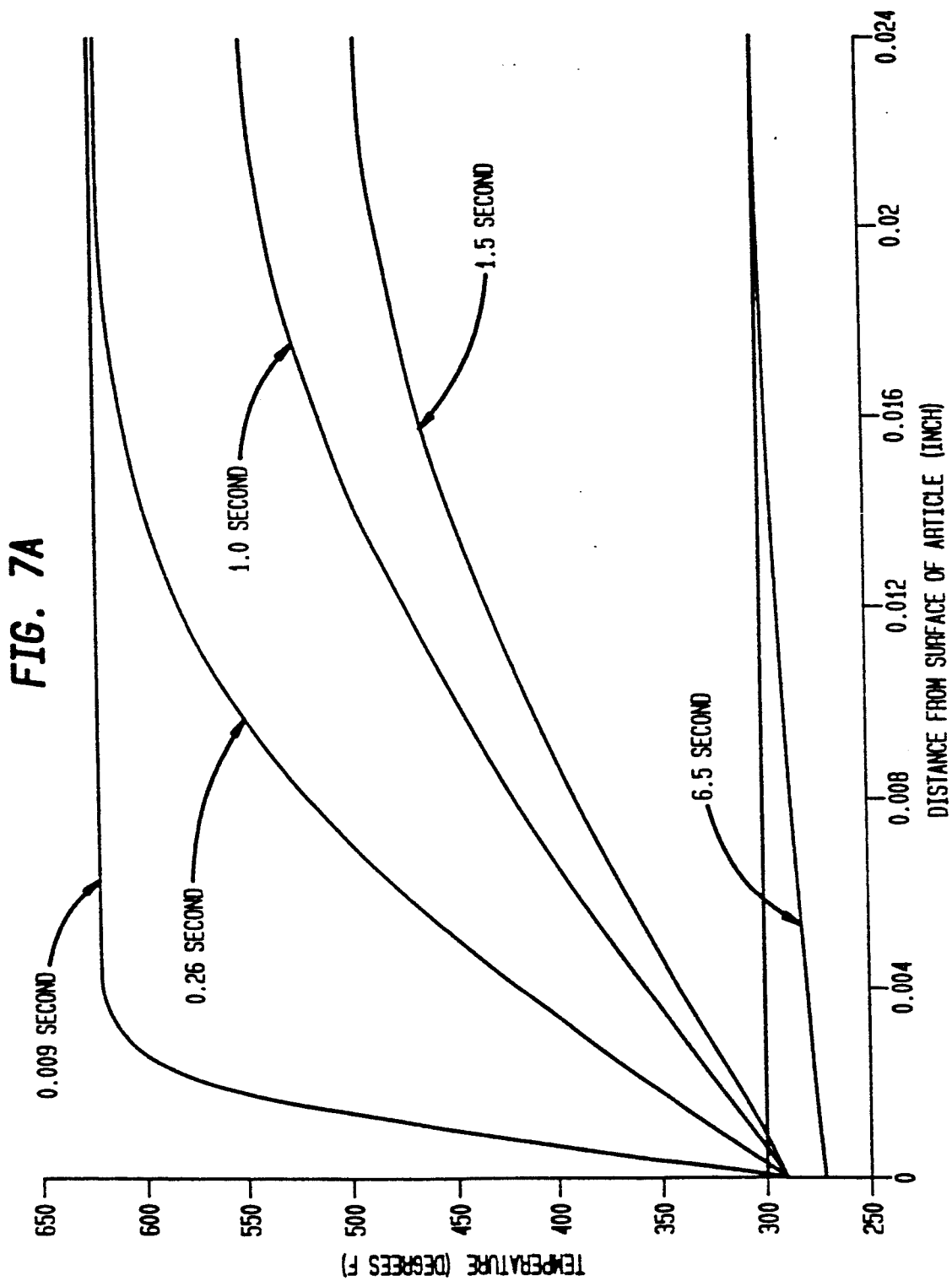
FIG. 7A are curves illustrating the results of a computer thermal analysis of a polycarbonate disk during injection molding in a conventional metal mold, with the temperature profiles being shown from the outer surface of the molded article to the centerline thereof at 0.26 second (the instant the cavity is completely filled), at 0.009, 1.0, 1.5, and 6.5 seconds after resin first contacts the cavity surface.

A thermal analysis of a mold according to the present invention was compared with that for a conventional all metal mold for making optical disks from polycarbonate which is an amorphous plastic. The optical disk is 0.048 inch thick in accordance with standard practice. The polycarbonate has a glass transition temperature about 300° F. The results of the computer simulation for polycarbonate injected at 620° F. into an all metal mold having an initial mold cavity surface temperature of 265° F. and heat transfer fluid temperature of 165° F. are shown in FIGS. 7A and 7B. The cavity surface temperature stabilized at 265° F. after about thirty five mold cycles.

FIG. 7A shows temperature profiles through the half thickness of the polycarbonate disk at various times during cooling. At 0.26 seconds the mold has completely filled. Flow stresses were being created up until this time. One can determine (referring to FIG. 4A) that any resin below 390° F. at 0.026 seconds has not had time to fully relax stresses in the resin. The first 0.003 inch from the disk surface is below 390° F. at 0.26 seconds and cannot, therefore completely relax. Actually, the thickness that cannot relax is greater than 0.003 inch because relaxation cannot begin until flow stops.

FIG. 7A also shows that because the resin solidifies at 300° F., a solid resin skin starts to form immediately upon contact with the cavity surface. The temperature gradient through the wall thickness is 355° F. when solidification starts.

FIG. 7B are temperature histories for the cavity surface and the center of the disk from the time the hot resin contacts the cavity surface until the entire disk is solid.

FIGS. 8A and 8B provide similar information for the method of the present invention using the mold of FIG. 5. Polycarbonate at 670° F. is injected into a mold having an initial cavity surface temperature that stabilized at 273° F. after 30 cycles and a heat transfer fluid temperature of 235° F. Quartz thermal control layers 14, 15, which are 0.60 inch thick, define the cavity surface. Digital information and grooves to be transferred to the optical disk are formed (e.g. micromachined or etched) in the surface of one of the layers 14 or 15.

FIG. 8A shows temperature profiles through the half thickness of the polycarbonate disk at various times during cooling. At 0.26 seconds the mold has completely filled as it did for the all metal mold. The mold cavity surface is at 385° F. at this time. At 1.0 second, which is 0.74 second later, the surface of the disk is at 380° F. Referring to FIG. 4A, one finds that polycarbonate at 380° F. will completely relax in 0.54 second, which is less than the 0.74 seconds actually experienced at the cavity surface. The rest of the resin through the thickness of the disk is hotter longer and therefore will also be fully relaxed. At 8.5 seconds, the surface of the disk has cooled to the 300° F. glass transition temperature and begins to solidify. The difference in temperature between the surface of the disk and the center of the disk wall thickness is about 24° F. when solidification starts. This is 0.5° F. per mil of wall thickness. Stresses due to shrinkage of resin within the wall of the disk after the surface solidifies will be extremely small.

FIG. 8B shows temperature histories for the cavity surface and for the center of the disk from the time the hot resin first contacts the cavity surface until the entire disk is solid. FIGS. 4A, 8A and 8B show that my invention causes the flow stresses to fully relax and then cools the surface slowly to cause the temperature gradients through the wall thickness to be greatly reduced at the time that solidification begins which ensures that stresses due to cooling are virtually non-existent.

EXAMPLE 2

A thermal analysis was also performed for molding polyethylene using a mold according to FIG. 6. The goal chosen for this example is to cause uniform and maximum crystallization through the wall thickness, including the surface. Crystallization behavior of the resin as provided in "Cooling Molded Parts—A Rigorous Analysis", S. Kenig et al., SPE Journal, July 1970- Vol. 26, was used for this analysis.

Dow Chemical's EP 245, a 0.953 density, 60% crystalline polyethylene product with a 0.125 inch wall thickness, was modeled. For the molding conditions assumed, the polyethylene starts to crystallize at about 250° F. The plastic is introduced at 500° F. to the 131° F. surface of a mold. The mold cavity surface is 0.060 inch thick quartz that is backed up by 0.020 inch thick polyimide. Heat transfer fluid at 70° F. is used to cool the mold. The cooling period is 60 seconds.

Figure 9B:
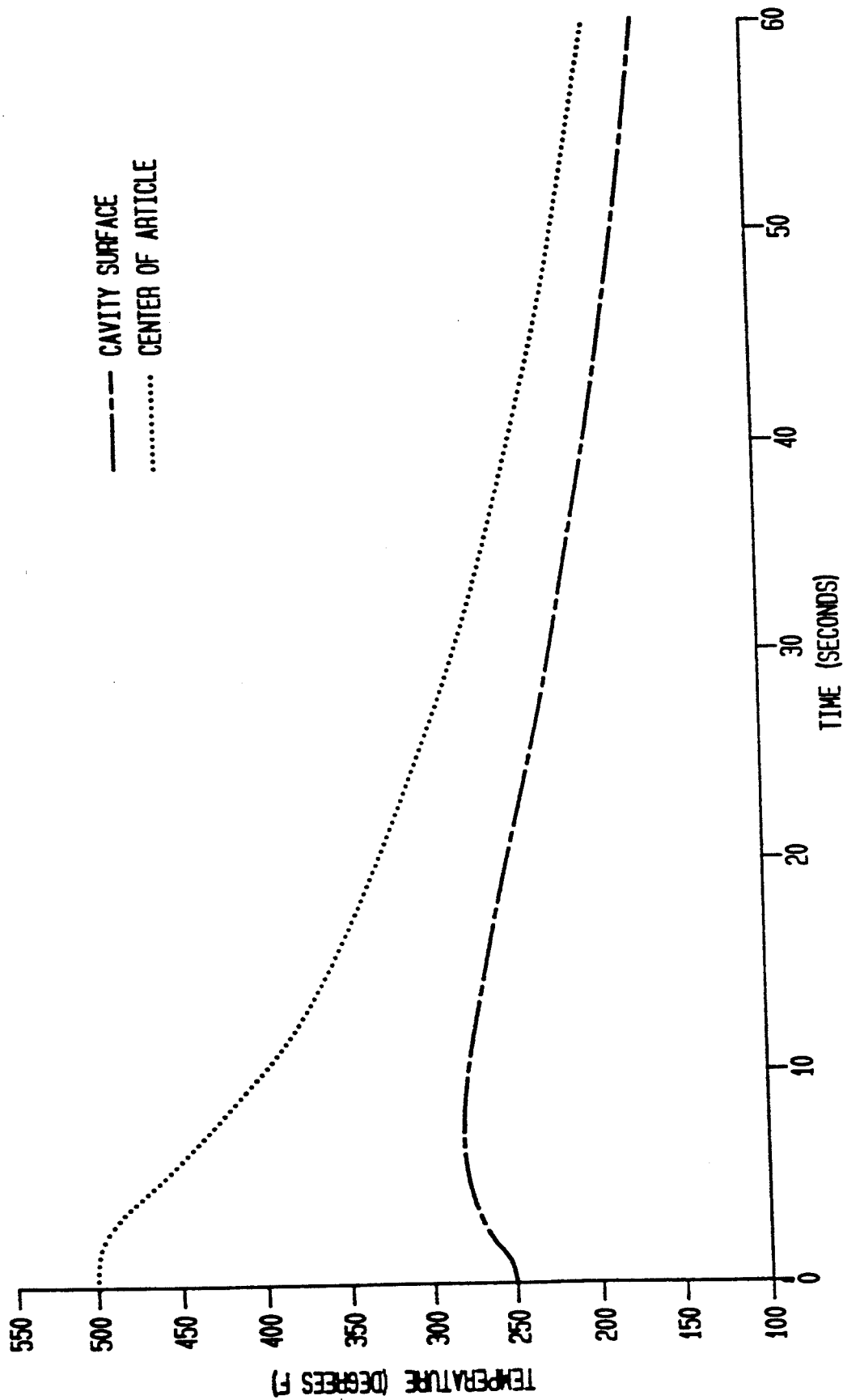
FIG. 9B is a diagram similar to that of FIG. 7B showing the temperature changes over time for the cavity surface and the center of a polyethylene article as it cools using the mold of FIG. 6.

Results of the analysis are shown in FIGS. 9A and 9B. They show that the cavity surface temperature is immediately increased upon contact with the hot resin to a temperature slightly above the crystallization onset temperature of 250° F. The cavity surface remains at this temperature until the heat starts to flow through the quartz layer into the polyimide layer, which causes the surface temperature to increase further to about 280° F. This temperature increase is due to the polyimide layer offering more resistance to heat flow than the quartz layer. When heat begins to flow into the polyimide layers, less heat flows from the quartz layer to the polyimide layer than flows into the quartz layer from the molten resin. Heat builds up in the quartz layer, thereby further increasing its temperature, which reduces the heat flow from the resin to the quartz layer and increases the heat flow from the quartz layer into the polyimide layer until the heat flow from the resin to the quartz layer is equal to the heat flow from the quartz layer to the polyimide layer. The cavity surface is maintained above the 250° F. crystallization onset temperature for 19.75 seconds while flow stresses relax and the center of the article cools, thereby reducing the temperature gradients through the article. The article then continues to cool. My invention causes the entire wall thickness, including the surface to cool slowly through the crystallization temperature range promoting increased and more uniform crystallization through the wall thickness. The article is removed when it cools to the heat deflection temperature which is 170° F. to 190° F.

EXAMPLE 3

This example simulates using the mold 29 of FIG. 10 to make a double convex polycarbonate lens. The lens has a 1 inch diameter, 1.5 inch spherical surface radius, 0.236 inch thickness at the center and 0.060 inch thickness at the edge. Thermal flow control insulator elements 14, 15 have spherical surface radii, are 0.165 inch thick at the center, 0.030 inch thick at the edge and are made of sapphire. Backing thermal flow control layers 16, 17 are 1.640 inches diameter polyimide. Layer 16 is 0.290 inch thick. Layer 17 is 0.410 inch thick. Metal inserts 9, 10 are 420 stainless steel. Heat transfer fluid at 180° F. is circulated through channels 31 and 33. Heat transfer fluid at 280° F. is circulated through channels 11, 12, 30 and 32. The resin injection temperature is 680° F. The lens cycle time is 5 minutes, which includes 4 minutes 50 seconds cooling and 10 seconds for mold close, injection, mold open, and part removal.

Figure 11:
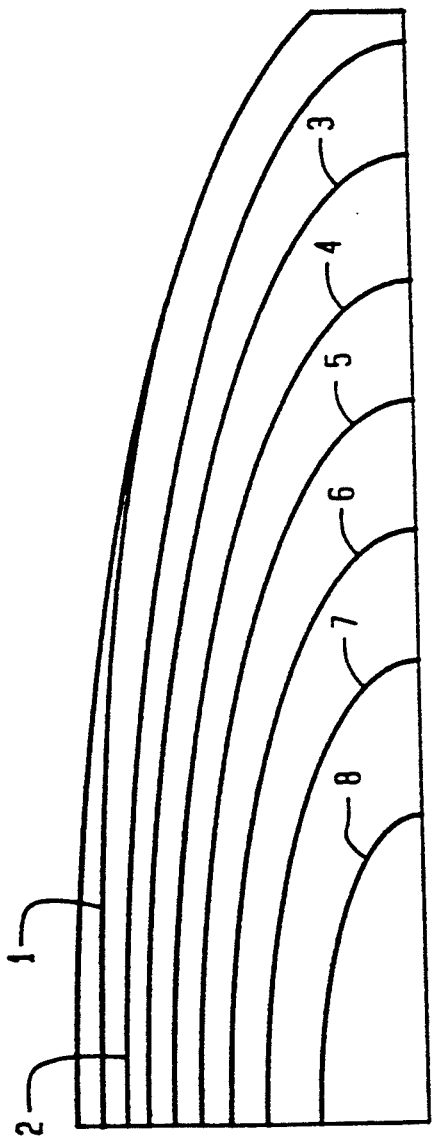
FIG. 11 is a graph of temperatures lines (isotherms) in a double convex polycarbonate lens about the time the lens starts to solidify in the mold of FIG. 10.

The results of the lens molding simulation are shown in FIGS. 11, 12, 13A and 13B. FIG. 11 shows that solidification starts 210 seconds after injection of the resin. The difference in temperature between the coldest point (the center of the lens at the surface) and the hottest point (the center of the lens at mid-thickness) when solidification begins is less than 16° F. This is about 0.07° F. per mil of lens thickness, which ensures that residual stress due to cooling is almost nonexistent.

FIG. 12 shows temperature lines (isotherms) in the lens at 4 minutes, 50 seconds after injection when the lens is removed from the mold.

Figure 13A:
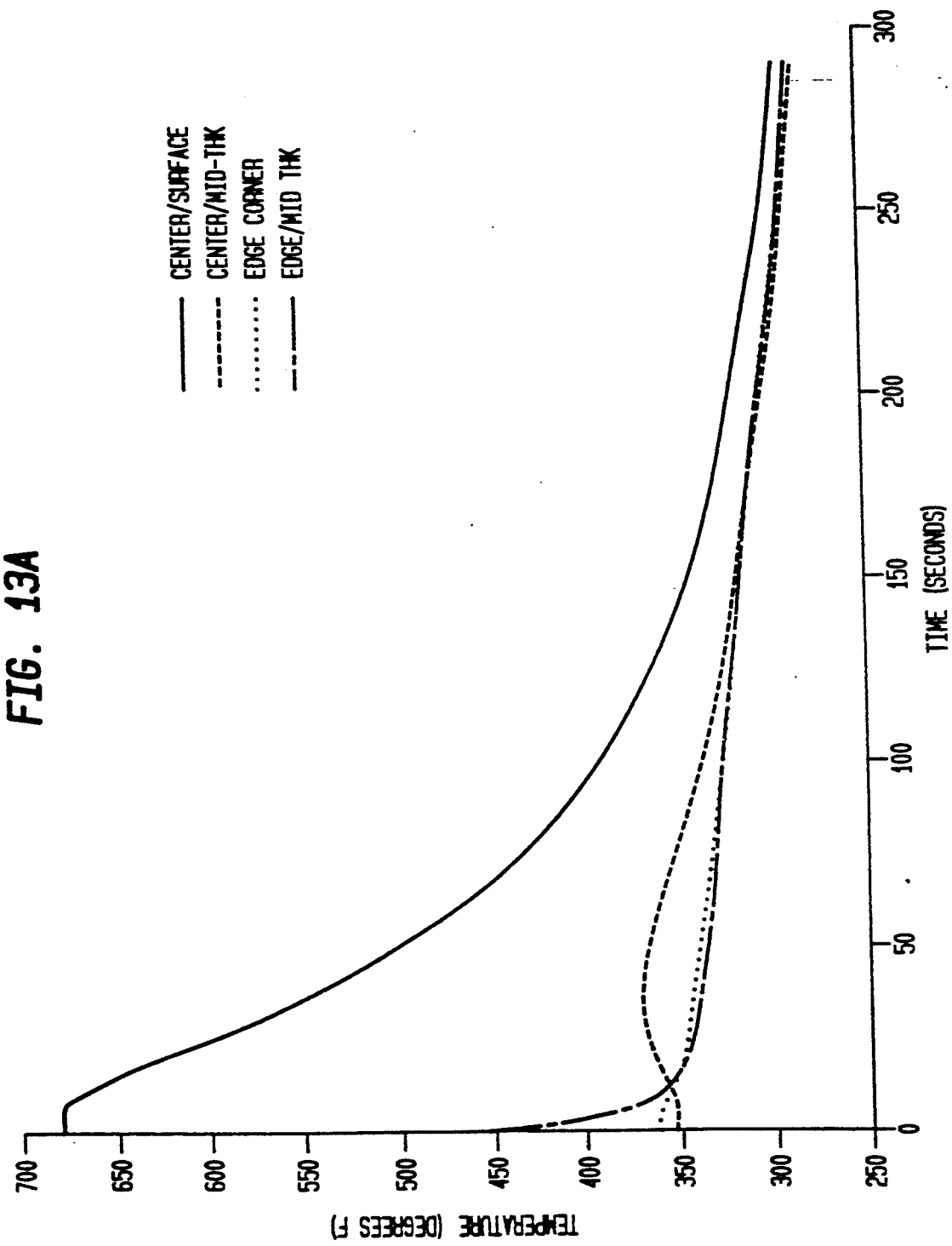
FIG. 13A is a graph of the temperature histories for key locations of the lens of FIG. 11 from the time the hot polycarbonate first contacts the mold of FIG. 10 until the lens is completely solid.

FIG. 13A shows the temperature histories for key locations of the lens from the time hot resin first contacts the cavity surface until the lens is solid enough to be removed from the mold. FIG. 13B is an enlarged view of the temperature histories of FIG. 13A for the first 20 seconds. Comparing the surface temperatures of the lens surface at the center of the lens, the edge corner of the lens and the edge at mid-thickness to the relaxation time curves of FIG. 4A, it is readily apparent that the entire surface of the lens is maintained at an elevated temperature long enough for any flow stresses in the resin to relax fully. Because all other points in the lens are hotter longer, they too fully relax.

While I have shown and described several embodiments in accordance with the present invention, it is to be understood that the same is not limited thereto but is susceptible to numerous changes and modifications as known to a person skilled in the art. For example, the method and molds can be adapted for use in compression molding, injection/compression molding and blow molding. Liquid crystal polymers may also be molded according to the invention. I therefore do not wish to be limited to the details shown and described herein but intend to cover all such changes and modifications as are obvious to one of ordinary skill in the art.

What is claimed is:

1. A method of molding a thermoplastic article that has very low residual stress comprising the steps of:
   (a) providing a mold containing first and second mold portions which are joined together to form a mold cavity in the shape of an article to be molded, each respective mold portion comprising:
      (1) one or more non-metallic thermal flow control insulator elements of predetermined thicknesses that form cavity surfaces of a mold, the insulator elements being made of materials that have much smaller mathematical products of thermal conductivity, density, and specific heat than tool steel, preferably one-tenth or less that of tool steel, and durability for use as the cavity surfaces of a product mold, preferably the materials are selected from the group consisting of quartz glass, pyrex glass, sapphire, and polyimide thermoplastic, whereby upon direct contact by molten plastic the insulator elements cause temperatures at cavity surfaces to immediately increase several times as much as they would if a metal mold is used;
      (2) dies adjacent to and in thermal communications with the insulator elements, said dies providing structural support to the insulator elements;
      (3) thermal means for applying substantially constant temperature control stimuli to said dies;
   (b) applying substantially constant temperature control stimuli to the dies throughout the molding cycle, the control stimuli being adjusted until, after many molding cycles the cavity surfaces are at predetermined temperatures that are below the solidifying temperature of the thermoplastic just prior to contact by molten thermoplastic;
   (c) increasing temperatures of the cavity surfaces by introducing molten thermoplastic into direct contact with the cavity surfaces of the insulator elements and using heat flowing from the molten plastic into the insulator elements in cooperation with said predetermined temperatures to immediately heat the cavity surfaces to temperatures that relax substantially all flow stresses from the molten thermoplastic in a predetermined short time, preferably temperatures are chosen that relax flow stresses in 3 to 5 percent of the time elapsed from introduction of molten thermoplastic until the mold is opened; and
   (d) after the cavity is filled, using heat flowing from the molten thermoplastic in cooperation with thermal resistance of the insulator elements to hold the cavity surfaces for said predetermined short time at or above temperatures that relax substantially all flow stresses, whereby flow stresses are virtually eliminated throughout a molded thermoplastic article, particularly at and near its surfaces.

2. A method according to claim 1, further including the step of:
   (e) after the flow stresses are relaxes, using thermal resistance of the insulator elements of said predetermined thicknesses in cooperation with declining heat flow from the molten thermoplastic to reduce temperatures of the cavity surfaces toward but above the temperature where the molten thermoplastic solidifies while the molten thermoplastic that is not in contact with the cavity surfaces cools faster thereby greatly reducing temperature gradients through the molten thermoplastic, after which the cavity surfaces fall below the temperature where the thermoplastic solidifies, whereby, due to small temperature gradients throughout the molded article when solidifying begins, stresses caused by uneven thermal shrinkage are virtually eliminated.

3. The method of claim 1, wherein the molded article is cooled more uniformly by reducing heat flow at edge surfaces of the cavity by using separate edge thermal flow control insulator elements to form the edge surfaces of said mold cavity, the edge insulator elements being made of a non-metallic materials that have smaller mathematical product of thermal conductivity, density, and specific heat than the insulator elements that form cavity surfaces of the rest of the cavity and also have the durability for use as the cavity surface of a production mold, preferably the materials are selected from the group consisting of quartz glass, pyrex glass, sapphire, and polyimide thermoplastic, whereby the edge insulator elements reduces heat flow at edge surfaces of the cavity to cause more uniform cooling of a molded article.

4. The method of claim 1, wherein in step (c) the increase in the temperature of the cavity surfaces to or above the temperature that relaxes substantially all flow stresses in the molten thermoplastic in said predetermined short time is achieved by including backing thermal flow control insulator layers inserted between said thermal flow control insulator elements and said dies and in thermal communication with both, the backing insulator elements being made of materials that have smaller mathematical products of thermal conductivity, density, and specific heat than the insulator elements, causing heat flow from the insulator elements to be restricted resulting in further increases in temperatures of the cavity surfaces during step (c) so that the cavity surfaces are increased to the flow stress relaxation temperature of the thermoplastic material using lower die temperatures.

5. The method of clam 4, wherein heat flow from the molten thermoplastic is tailored to cool the thermoplastic more uniformly by using thickened or thinned insulator elements and backing insulator layers at various locations, preferably backing insulator layers being thickened at locations where the insulator elements are thinned and thinned where insulator elements are thickened.

6. The method of claim 1, where said thermoplastic is amorphous thermoplastic.

7. A method of molding a crystalline thermoplastic article that has low residual stress and more uniform crystallization comprising the steps of:
  (a) providing a mold containing first and second mold portions which are joined together to form a mold cavity in the shape of an article to be molded, each respective mold portion comprising:
    (1) one or more non-metallic thermal flow control insulator elements of predetermined thicknesses that form cavity surfaces of a mold, the insulator elements being made of materials that have much smaller mathematical products of thermal conductivity, density, and specific heat than tool steel, preferably one-tenth or less that of tool steel, and durability for use as the cavity surfaces of a production mold, preferably the materials are selected from the group consisting of quartz glass, pyrex glass, sapphire, and polyimide thermoplastic, whereby upon direct contact by molten plastic the insulator elements cause temperatures at cavity surfaces to immediately increase several times as much as they would if a metal mold is used;
    (2) dies adjacent to and in thermal communications with the insulator elements, said dies providing structural support to the insulator elements;
    (3) thermal means for applying substantially constant temperature control stimuli to said dies;
  (b) applying substantially constant temperature control stimuli to the dies throughout the molding cycle, the control stimuli being adjusted until, after many molding cycles the cavity surfaces are at predetermined temperatures that are below the solidifying temperature of the crystalline thermoplastic just prior to contact by molten crystalline thermoplastic;
  (c) increasing temperatures of the cavity surfaces of the mold by introducing molten crystalline thermoplastic into direct contact with the cavity surfaces of the insulator elements and using heat flowing from the molten plastic into the insulator elements in cooperation with said predetermined temperature to immediately heat said cavity surfaces of the mold above the crystallization temperatures of the molten crystalline thermoplastic;
  (d) after the cavity is filled, using heat flowing from the molten crystalline thermoplastic in cooperation with thermal resistance of the insulator elements to hold the cavity surfaces above the crystallization temperature of said crystalline thermoplastic for a period of time sufficient to relax substantially all flow stresses, whereby flow stresses are virtually eliminated throughout a molded crystalline thermoplastic article, particularly at and near the surface; and
  (e) after the flow stresses are relaxes, using thermal resistances of the insulator elements of said predetermined thicknesses in cooperation with heat flow from the molten crystalline thermoplastic to cause the cavity surfaces to cool slowly while the molten crystalline thermoplastic that is not in contact with the cavity surfaces cools faster thereby greatly reducing temperature gradients through the molten crystalline thermoplastic and also causing it to gradually cool down through the crystallization temperature range of said crystalline thermoplastic, whereby more uniform crystallization is achieved throughout a molded crystalline thermoplastic article particularly at and near the surface.

8. The method of claim 7, wherein the molded article is cooled and crystallized more uniformly by reducing heat flow at edge surfaces of the cavity by using separate edge thermal flow control insulator elements to form the edge surfaces of said mold cavity, the edge insulator elements being made of a non-metallic material that have smaller mathematical products of thermal conductivity, density, and specific heat than the insulator elements that form surfaces of the rest of the cavity and also has the durability for use as the cavity surface of a production mold, preferably the materials are selected from the group consisting of quartz glass, pyrex glass, sapphire, and polyimide thermoplastic, whereby the edge insulator elements reduce heat flow at edge surfaces of the cavity to cause more uniform cooling and crystallization of a molded article.

9. The method of claim 7, wherein in step (c) the increase in the temperature of the cavity surfaces above the crystallization temperature of the thermoplastic is achieved by including backing thermal flow control insulator layers inserted between said thermal flow control insulator elements and said dies and in thermal communication with both, the backing insulator elements being made of materials that have smaller mathematical products of thermal conductivity, density, and specific heat than the insulator elements, causing heat flow from the insulator elements to be restricted resulting in further increases in temperatures of the cavity surfaces during step (c) so that the cavity surfaces are increased above the crystallization temperature of the crystalline thermoplastic material using lower temperatures at the dies.

10. The method of claim 9, wherein heat flow from the molten crystalline thermoplastic is tailored to cool and crystalline the thermoplastic more uniformly by using thickened or thinned insulator elements and backing insulator layers at various locations, preferably backing insulator layers being thickened at locations where the insulator elements are thinned and thinned where insulator elements are thickened.

* * * * *